United States Patent
Pancha et al.

(10) Patent No.: US 6,823,373 B1
(45) Date of Patent: Nov. 23, 2004

(54) SYSTEM AND METHOD FOR COUPLING REMOTE DATA STORES AND MOBILE DEVICES VIA AN INTERNET BASED SERVER

(75) Inventors: Girish Pancha, San Francisco, CA (US); A. Adam Wilson, Oakland, CA (US); Sankaran Suresh, Santa Clara, CA (US); Spencer A. Lord, San Francisco, CA (US)

(73) Assignee: Informatica Corporation, Redwood City, CA (US)

( * ) Notice: Subject to any disclaimer, the term of this patent is extended or adjusted under 35 U.S.C. 154(b) by 435 days.

(21) Appl. No.: 09/637,958

(22) Filed: Aug. 11, 2000

(51) Int. Cl.[7] .............................................. G06F 13/00
(52) U.S. Cl. ........................ 709/219; 709/225; 707/104
(58) Field of Search ................................ 709/217, 219, 709/225, 328, 329, 202; 719/328, 329; 707/10, 104

(56) References Cited

U.S. PATENT DOCUMENTS 6,192,364 B1 * 2/2001 Baclawski .................... 707/10
6,336,137 B1 * 1/2002 Lee et al. .................... 709/219
6,430,624 B1 * 8/2002 Jamtgaard et al. .......... 709/246
6,446,096 B1 * 9/2002 Holland et al. ............. 707/513
6,457,030 B1 * 9/2002 Adams et al. .............. 707/523

FOREIGN PATENT DOCUMENTS

EP         0987868 A3     3/2000    ........... H01L/29/06

OTHER PUBLICATIONS

"A Process for Selective Routing of Servlet Transcoding Modules", IBM Technical Disclosure Bulletin, vol. 42, issue 422, Jun. 1999.*
Multi–Modal Data Access Research disclosure, Kenneth Mason, Publications, Hampshire, GB, No. 426. Oct. 1999, pp. 133–1386 XP000907811.

* cited by examiner

Primary Examiner—Viet D. Vu
(74) Attorney, Agent, or Firm—Fenwick & West LLP

(57) ABSTRACT

The present invention provides a mobile data communication system which couples application specific remote data sources and mobile devices via an internet based server. An interface is provided by the server for extracting data from the application specific remote data sources. The extracted data is then generalized into generic objects and presented on the mobile devices by device specific application templates.

13 Claims, 21 Drawing Sheets

From Fig. 16A

SYSTEM AND METHOD FOR COUPLING REMOTE DATA STORES AND MOBILE DEVICES VIA AN INTERNET BASED SERVER

FIELD OF THE INVENTION

This invention relates generally to a system for coordinating the communication of data to mobile users, and more particularly a multi-tiered, modular, distributed, Internet computing architecture that integrates data communication between data sources and mobile devices.

BACKGROUND OF THE INVENTION

The Mobile Communications Environment

The year 2000 marks the rapid expansion of the enterprise across multiple boundaries. According to Cahners In-Stat Group (Facts & Stats for the Enterprise Market), large firms are struggling to manage growing numbers of mobile workers, remote branch offices and telecommuters. By the year 2004, it is expected that the average large corporation will support approximately 153 remote branch offices and 660 telecommuters. In order to support the growing number of mobile workers and improve their productivity, more large companies are supporting the use of wireless phones and other mobile devices. By 2004, large firms are expected to employ more than 29 million wireless-enabled workers. Clearly there is a need for enterprises to embrace the convergence of the Internet with wireless technologies and develop strong mobile data strategies.

The convergence of wireless technologies with the Internet has driven a proliferation of mobile computing devices and, subsequently, will enable more mobile users to be productive, and profitable, while working away from the office. The Yankee Group (Wireless Data: Hope after Hype—extract from Interactive Week, $6^{th}$ Dec. 1999) estimates that the total number of mobile data users will grow to 21.3 MM by 2001 and 50 MM by 2004. META Group estimates that within three to five years, 80% of knowledge workers will employ companion-computing devices like cellular phones and PDAs. This year alone, according to Cahners In-Stat Group, more than 13 million enterprise employees will use wireless phones and other devices.

Mobile professionals are an integral part of the enterprise and the current climate demands, "anywhere access" to enterprise and personal data. Unfortunately, mobile professionals are armed with many devices to access, manage and communicate information.

To remain competitive, enterprises need to establish mobile data strategies. Enterprises cite increased productivity and increased efficiency as the main benefits of implementing wireless data strategies. (Cahners In-Stat Group, Wireless Data Market Segmentation Forecasts, Rebecca S. Dierks, November 1999) To reap these rewards, mobile users need access to productivity applications that combine enterprise data derived from corporate directories, calendars and email with personal data such as personal directories, public internet data such as location-based services, maps, yellow and white pages with communication services such as email, voice activated dialing, remote printing, alerts and notifications. The solution for integrating these services must be cost effective in terms of both time and money, low maintenance, secure and in compliance with open standards

BACKGROUND ART

Early mobile data strategies evolved around the use of synchronization technology in conjunction with laptops and PDAs.

Later technology has focused on transcoding of existing web application interfaces to provide wireless and voice access from Internet enabled phones, PDAs and cellular phones respectively. However, without the appropriate infrastructure, these applications do not provide a truly productive experience for mobile professionals. Mobile users are still forced, using this approach, to navigate between multiple applications, which, results in excessive data entry and a time consuming, frustrating user experience.

Both solutions have evolved primarily from a one-off, custom solution approach, which is expensive on time and resources. In addition, both solutions have focused primarily on wireless access to enterprise data.

Applications such as contact managers, calendars and to-do lists are all in is abundance and widely available from standard web browsers or desktop applications. The challenge is how best to mobilize these, and other enterprise applications, for mobile professionals. To-date, two technology approaches have been taken.

The first generation of vendors approached the need for mobile access to enterprise applications by using synchronization technology to update and download information between the mobile professional's computing devices (laptop and PDAS) and the enterprise. The problem with this approach is that data is very often obsolete as soon as the device is disconnected.

The second generation of mobilization vendors is trying to take advantage of the exploding mobile data services market by transcoding or translating existing web applications so they are accessible using WAP browsers and voice recognition systems. However, working at the user interface level as opposed to the data source is inefficient, as web layout and HTML are subject to constant change.

Both these approaches serve a purpose. However, the approaches taken by these vendors is simplistic and does not provide the intelligent integration and personalized, contextual workflow needed to meet the requirements of today's mobile professional and the enterprise that supports them. Specifically, these solutions do not provide the productivity enhancements necessary for mobile professionals, nor, the fast return on investment (ROI) necessary for enterprises.

First generation synchronization technology vendors provide solutions for duplicating and maintaining multiple copies of enterprise data on mobile devices for off-line access. For example, downloading inventory and work schedule information onto a laptop or PDA device. This approach can be a slow and expensive one to implement. In addition, as more real-time information is needed to remain competitive, this approach results in reduced productivity for the mobile professional and low return on investment for the enterprise.

- Often synchronization technology does not take advantage of the most ubiquitous device for mobile professionals, the mobile phone. Executives and mobile professionals often prefer voice access to information. Distribution of additional devices such as PDA's can introduce new administrative costs to the enterprise.
- Multiple sets of information exist on different devices e.g. PDA, laptop, and cellular phone. With more than one place to store data, there are often data accuracy issues, which wastes valuable time.
- Changes to data, by multiple users, create the potential for duplicate records, adding to the accuracy problem.
- Data is rarely accessed in real-time and is, very often, obsolete as soon as you disconnect. Data is only updated when a synchronization event occurs. The result to the mobile professional could be as simple as not having the correct phone number on hand, or as important as not getting a $1 MM sale recognized until the next business day.

Second generation transcoding technology vendors take existing web sites and applications (typically on a one-off, custom basis) and simply translate them from HTML to other markup languages such as WML, HDML and VoiceXML to provide access from telephones, wireless devices or voice recognition systems. This approach is faster and simpler to implement than synchronization technology but still results in reduced productivity for the mobile professional and low return on investment for the enterprise.

Wireless applications need to be re-built when web layout and content changes. This process is very resource intensive and results in high expense for the enterprise, considering the potential number of times a web site changes.

Discrete wireless applications. Data needs to be re-entered across applications. For example, an address is retrieved from a contact manager and then has to be re-entered in order to retrieve directions from a travel application.

Navigational menus are not intelligently integrated into a mobile workflow. For example, after reviewing a customer appointment from the calendar, activity options do not include 'go there', 'call', and 'email'.

Wireless applications need to poll web sites constantly. For the provider, continuous polling of sites is an inefficient and expensive use of resources.

SUMMARY OF THE INVENTION

The present invention solves the problem of providing access to vital information for mobile professionals within the enterprise by providing unified access to relevant. More particularly, the present invention provides an application interface to enterprise, personal and public data, accessible in a personalized, contextual workflow via voice, wireless devices and the Web.

The present invention's open architecture delivers solutions for both mobile client application uses an underlying infrastructure to provide a unified interface to existing enterprise applications such as Microsoft Outlook and Lotus Notes; personal applications such as contact managers, public Internet applications such as maps, turn-by urn driving directions and proximity searches and communication services such as email, voice activated dialing, remote printing, alerts and notifications. A personalized workflow delivers relevant information, within the context of the current application, via device specific user interfaces for voice, wireless and the Web. This approach provides significant ease of use and productivity benefits to the mobile professional.

The present invention solves the problems described above in the Background of the Invention by providing a mobile data communication system which couples application specific remote data sources and mobile devices via an internet based server. An interface is provided by the server for extracting data from the application specific remote data sources. The extracted data is then generalized into generic objects and presented on the mobile devices by device specific application templates.

The present invention has other objects and advantages which are set forth in the Description of the Best Mode of the Invention. The features and advantages described in the specification, however, are not all inclusive, and particularly, many additional features and advantages will be apparent to one of ordinary skill in the art in view of the drawings, specification, and claims herein.

DETAILED DESCRIPTION OF THE BEST MODE OF THE INVENTION

The preferred embodiment is implemented in Java using a fully extensible, object-oriented model, running against an Oracle8i database. It is deployed using a multi-tiered, modular, distributed Internet computing architecture and comprises server infrastructure which facilitates communication of data between mobile users and integrated mobile applications in an integrated and seamless manner.

Figure 1:
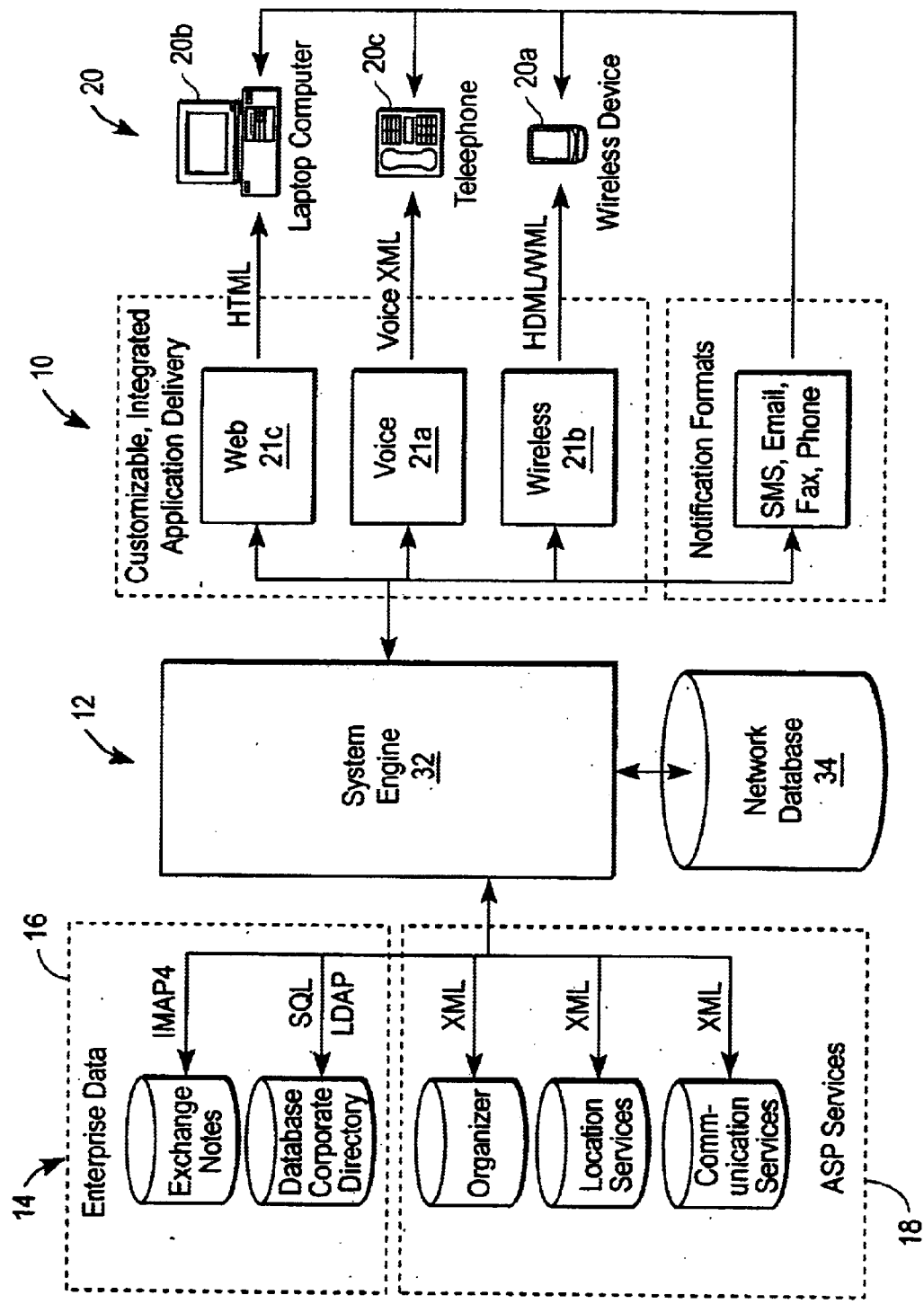
FIG. 1 is a block diagram of the system of the preferred embodiment.

System 10 of the preferred embodiment is generally depicted in FIG. 1, which illustrates the relationship between system server 12 and integrated applications 14 (including data sources such as enterprise applications 16 and Internet ASP applications 18), and mobile devices 20. System server 12 provides mobile devices 20 with unified access to the data stores of integrated applications 14. Exemplary mobile devices 20 include virtually any device that can communicate over the Internet, intranets, wireless WAP connections, or PSTN such as wireless phones, wireless PDA's 20a, laptop computers 20b, desktop computers, and conventional telephones 20c.

Enterprise applications 16 which provide varied sources of data include: email, calendar, directory of contacts, to do lists, notes, sales force automation (SFA), customer relationship management (CRM) and enterprise resource planning (ERP) systems. Applications can be used 'as is' or seamlessly interfaced to the data content held in corporate applications such as Microsoft Exchange and Lotus Notes. Regardless, system 10 has the same user interface for mobile devices 20 (i.e., a device specific generic interface for each unique type of device such as WAP phones, PDA's, laptop computers and telephones), just a different source of data.

Integration with third party ASP applications 18 provides additional functionality such as: driving directions, point of interest searches, maps; yellow pages, white pages; group outbound messaging, alerts/notifications with acknowledgements; and lastly, data synchronization to enable migration from older technology solutions to the system service.

To the mobile user, these otherwise discrete applications (both enterprise applications 16 and ASP applications 18) all appear as one logical application because of the present invention underlying core infrastructure. Applications 14 are presented to the user on mobile devices 20 using device specific user interfaces 21 for voice 21*a*, wireless devices 21*b* and the Web 21*c*. These applications can be implemented using a variety of mobile markup languages (HTML, WML, HDML, VoiceXML) or using mobile SDKs (SpeechObjects). Unlike second generation transcoding approaches, this ensures maximum utility of the application, regardless of the device used. This is especially important, when considering the transformation of a web application to voice. In addition, application workflows that are role, location, context and data aware ensure relevant, real-time information delivery and superior ease of use and navigation. Once workflows are defined, using the web based system administrator interface, workflows remain consistent regardless of the source of the data.

In more detail, system 10 communicates over a variety of communication paths (including Web, WAP and Voice) to various personal devices and desktop applications (mobile devices 20) presentation clients 21 using a number of protocols. An HTML client enables web browser interfaces. A Voice style client enables telephone interfaces with speech recognition and text-to-speech synthesis. An HDML/WML client delivers content to wireless digital telephones through a WAP gateway and network. An XML adapter works over HTTP, enables server-to-server integration with ASP applications 18 and provides functionality such as synchronization with desktop PIMs (e.g.: Microsoft Outlook) and PDAs (e.g.: Palm, Windows CE devices).

Due to the modular nature of the architecture, the system is able to provide these client and adaptor services on an individual basis, so that a user or organization who is not interested in, for example, WAP connectivity need not subscribe to it. This modular architecture also allows for interchangeable content such as localized yellow pages.

As shown in FIG. 1, at the core of the system architecture is the system server 12 that comprises system network database 34 and system engine 32. Network database 34 is a schema hosted on a scalable relational database server (Oracle8i) that contains the data about various system core objects as well as the meta-data that defines the data. Network database 34 is used to efficiently and securely specify notification rules, and publish and update information to other users in real-time. System engine 32 provides the ability to access and manipulate the core objects. Information is then brokered between applications 14 and mobile devices 20 using system engine 32 at a data server-to-data server level. This infrastructure provides the ability to "plug & play" virtually any application service as long as it uses a supported application program interface (API).

System 10 also includes device specific navigational menus that leverage the users previous action, thereby keeping the user in a workflow context. This greatly reduces the number of keystrokes required to use wireless data applications and provides significant ease of use for voice recognition applications. For example, the address obtained from a user's address book application can be used to obtain turn by turn directions. ASP applications 16 also leverage system server 12 and integrate as native navigational menus.

System 10 adheres to open standards to ensure compliance with the latest technology advances. Third party ASP applications 16 covering functionality such as location aware services, outbound messaging, alerts & notifications, email, and calendaring plug into the system platform using XML or other standard interfaces such as LDAP, IMAP4, POP3, CDO, SQL, and SMTP.

System server 12 maintains a subset of profile information (when authorized) and optionally maintains private directory information in a distributed database on a system hosted server. At the lowest level, the system administrator has full control of data and user privileges.

Secure Access

Providing secure access to data is of paramount importance for enterprises. When services are provided on an ASP basis, security is even more important. System server 12 (for both private and public services) simply interfaces to enterprise data sources 16 through a secure Virtual Private Network (VPN). All enterprise data remains in the enterprise where it is most secure.

Figure 2:
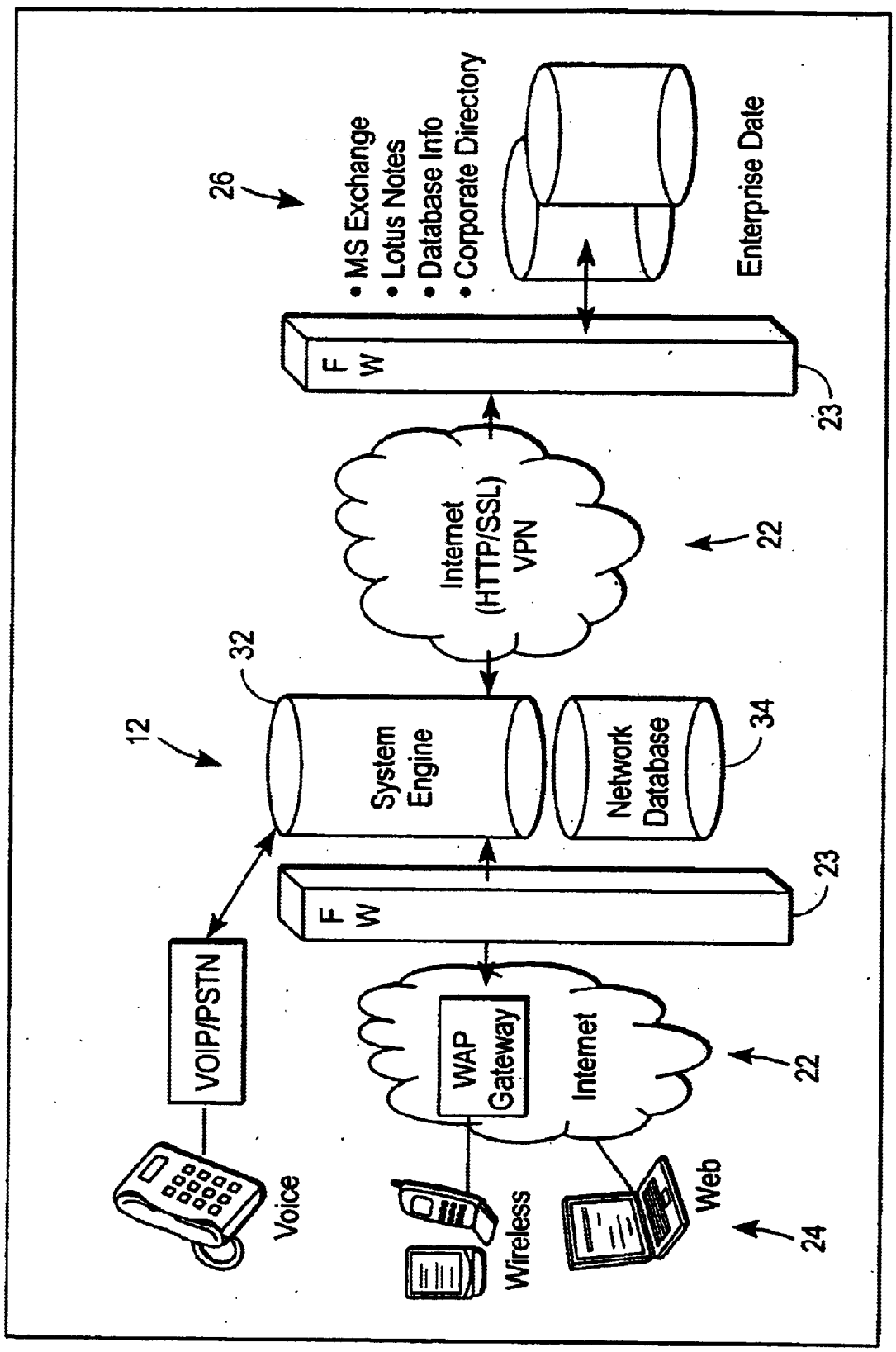
FIG. 2 is a block diagram of the secure access provided by the system of the preferred embodiment.

As shown in FIG. 2, security is provided at three levels: network/transport layer 22, application services 24, and data services 26.

At the network/presentation layer 22, a typical configuration will involve enterprise data residing at the customer site where it is most secure. The enterprise site administrator conducts any administration. System server 12 is hosted at a secure site and interfaces to enterprise data through the corporate firewall and a secure VPN 23.

As depicted in FIG. 2, the system conforms to industry standards on authentication and encryption at the Secure Socket Layer (SSL), using VeriSign technology and also at the WAP Gateway level with Wireless Transport Layer Security (WTLS). Each mobile user is required to login to system server 12 with a unique USERID and password. Using SSL/WTLS ensures that any information exchanges with system server 12, during a session, is secure.

At the application services level 24, mobile users access system by supplying a username/password via the Web; an account number and PIN via wireless devices; and voice print authentication (with backup of account number and PIN) via voice recognition. Once logged in, multiple users can be given permission to have authoring privileges over subsets of data. For example, both the individual and the company that he/she works for can make changes to an individual's work address. These changes are then propagated to another part of the organization (e.g., a project team). System 10 supports single sign-on between integrated applications 14 accessed via system server 12. This means once a user has logged in, they do not have to repeat their username and password to access individual areas of application functionality. Thus, in addition to providing unified application access, system 10 provides a unified login procedure.

At the data services level 26, the Distributed Data Store (DDS) architecture of system 10 implicitly provides for data security. This means that while providing system 10 to one enterprise, on an ASP basis, their data store is kept independent and secure from other enterprises. System 10 is deployed in one of two ways:

The enterprise hosts the application and data at their own secure local site, which is linked to system server 12. (Typical configuration for large enterprises).

System server 12 hosts the enterprise application on a distributed database at a secure data center and interfaces to enterprise data through a firewall and Virtual Private Network (VPN). (Typical configuration for small to medium enterprises).

Customization

System 10 is provided to enterprises on an ASP basis, and as a result, mechanisms for customizing the application presentation are in place. This section outlines several alternatives for building a system site, or linking to it from an existing site.

Enterprises are able to specify basic customizations. These customizations are performed automatically by system server 12 and do not require any effort on the part of the IT department. System 10 supports the following site customization components:

Site Graphics: Custom graphics can be positioned at the top, side, and/or bottom of a page. In its simplest form, the site graphic can consist of a single image. Alternatively, companies can specify a set of HTML code for a more complex presentation. In either case, they are responsible for the supporting files (GIFs, JPEGs, Java applets) and HTML code. In the case of WML, basic graphics such as company tag lines are supported.

Colors and Fonts: Text, fonts and background colors of various sections (e.g.: directory, yellow pages, etc.) can be customized to adhere to the 'look and feel' of the company site. This applies currently to HTML code.

Naming Conventions: Companies are able to specify their own names for various features and concepts in the site. For example, an address book or a "contact list" or a "directory". This is applicable for HTML, WML and VoiceXML.

Voice Prompts: Companies are able to customize all voice prompts for any voice interfaces. An API is provided that is based on open standards (XML and HTTP).

WML: Enterprises can also customize a set of configuration parameters thereby enabling or disabling menu items for each screen. This is applicable for WML.

System Architecture

System 10 is a mobile data communication system that includes, as depicted in FIG. 1, application specific remote data sources (integrated applications 14); internet based system server 12 which is coupled to application specific remote data sources 14 over a communication path such as the Internet or PSTN (voice); and mobile devices 20 coupled to system server 12. System server 12 includes server database 34, interface software (extraction adapters 28) for extracting data from application specific remote data sources (applications 14) and generalizing the extracted data by constructing core data objects 30, and software for presenting the generalized data to mobile devices 20. Mobile devices 20 include web browsers and application templates for displaying the presented data from system server 12.

Figure 3:
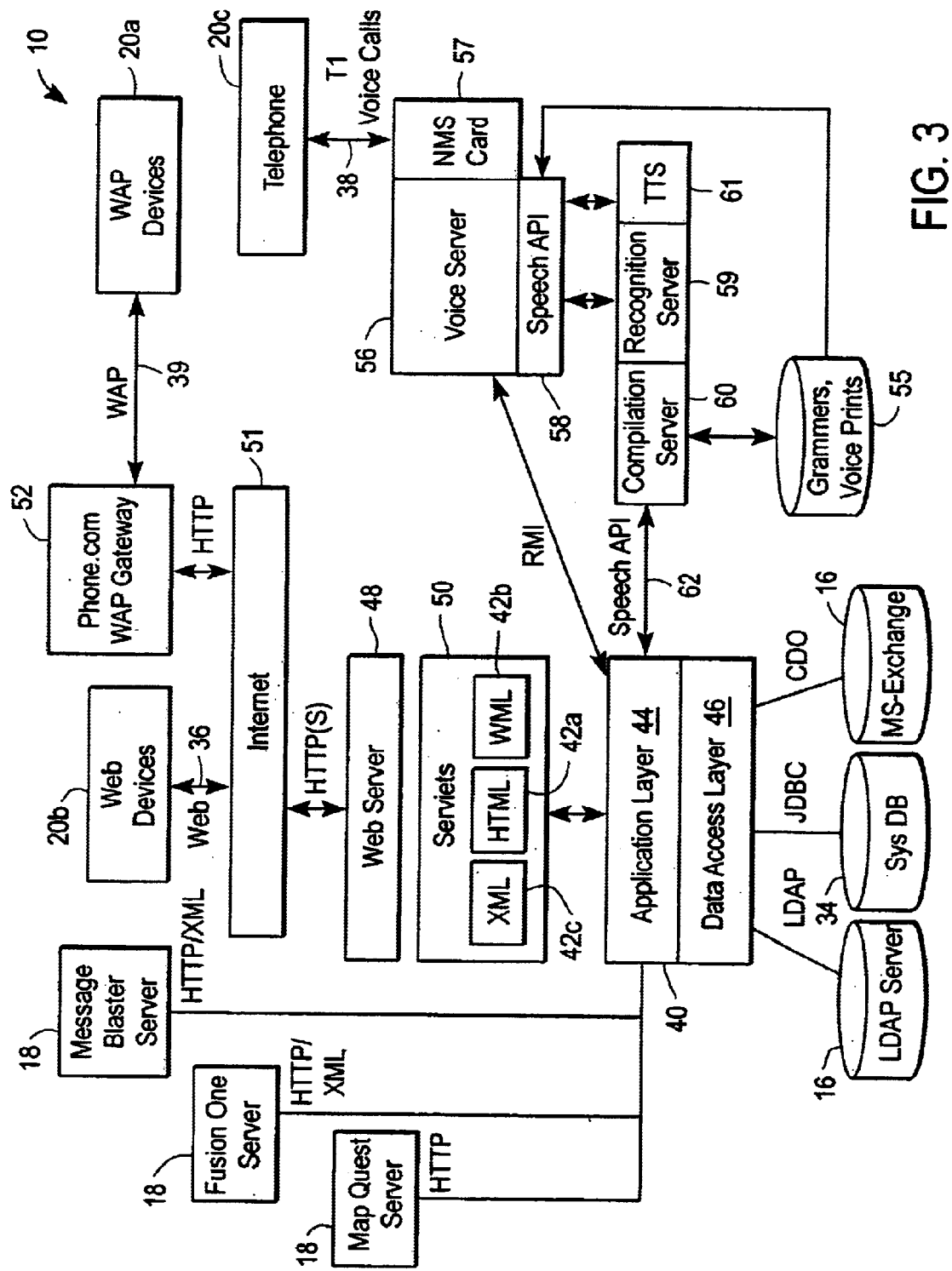
FIG. 3 is a block diagram of the detailed architecture of the system of the preferred embodiment.

The architecture of System 10 is depicted in detail in FIG. 3. As shown, the multi-tiered system server architecture and communicates with mobile devices 20 via any of three communication paths—web 36, voice 38 and/or wireless (i.e., WAP) 39.

Figure 4:
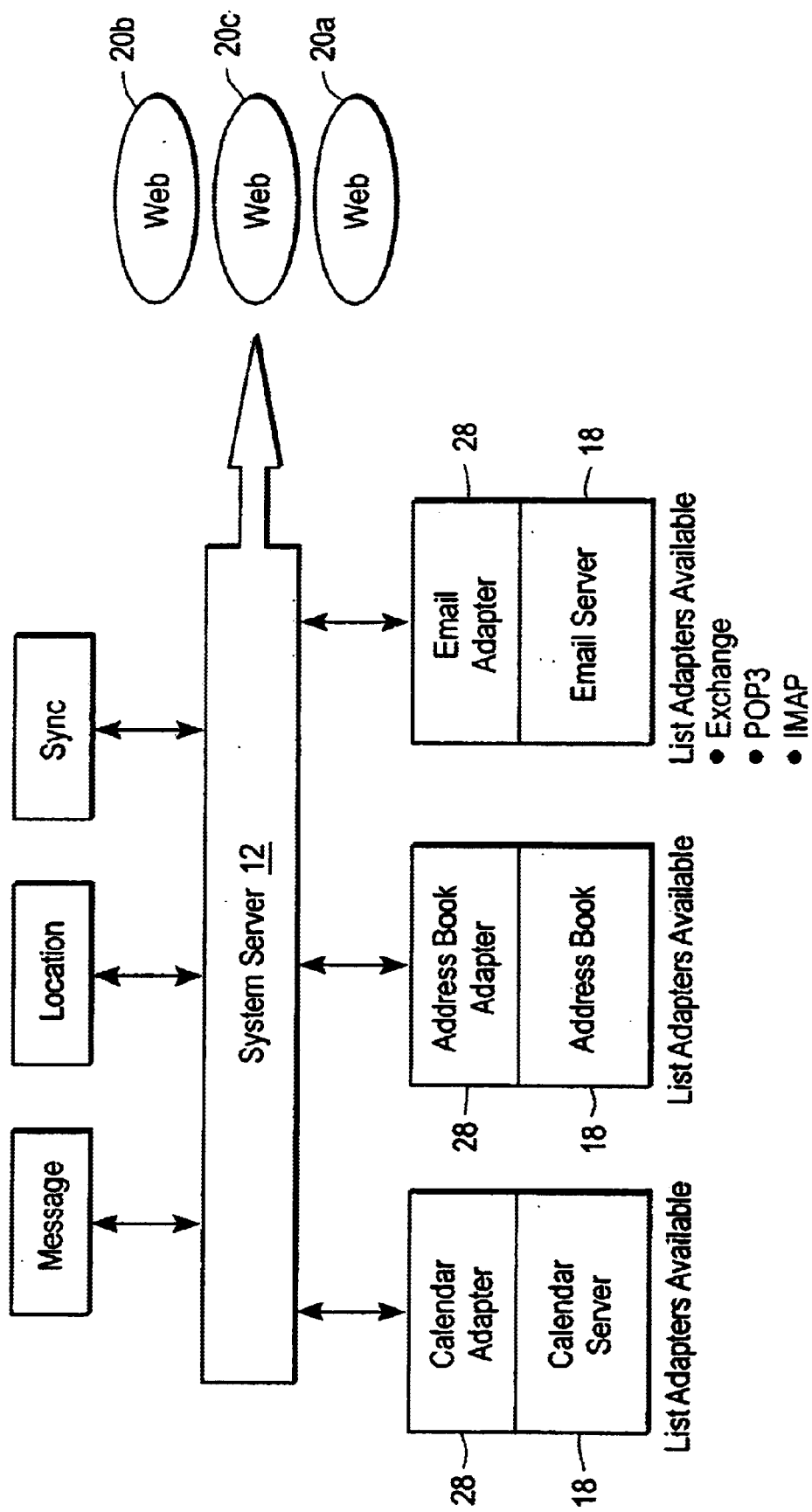
FIG. 4 is a block diagram of the data flow in the system of the preferred embodiment.

As shown in FIG. 4, data flow is two way between enterprise applications 16, ASP applications 18 and mobile devices 20, and system server 12. All data communicated between integrated applications 14 (enterprise applications 16 and ASP applications 18) and mobile devices 20 pass through and are directed by system server 12.

Figure 5:
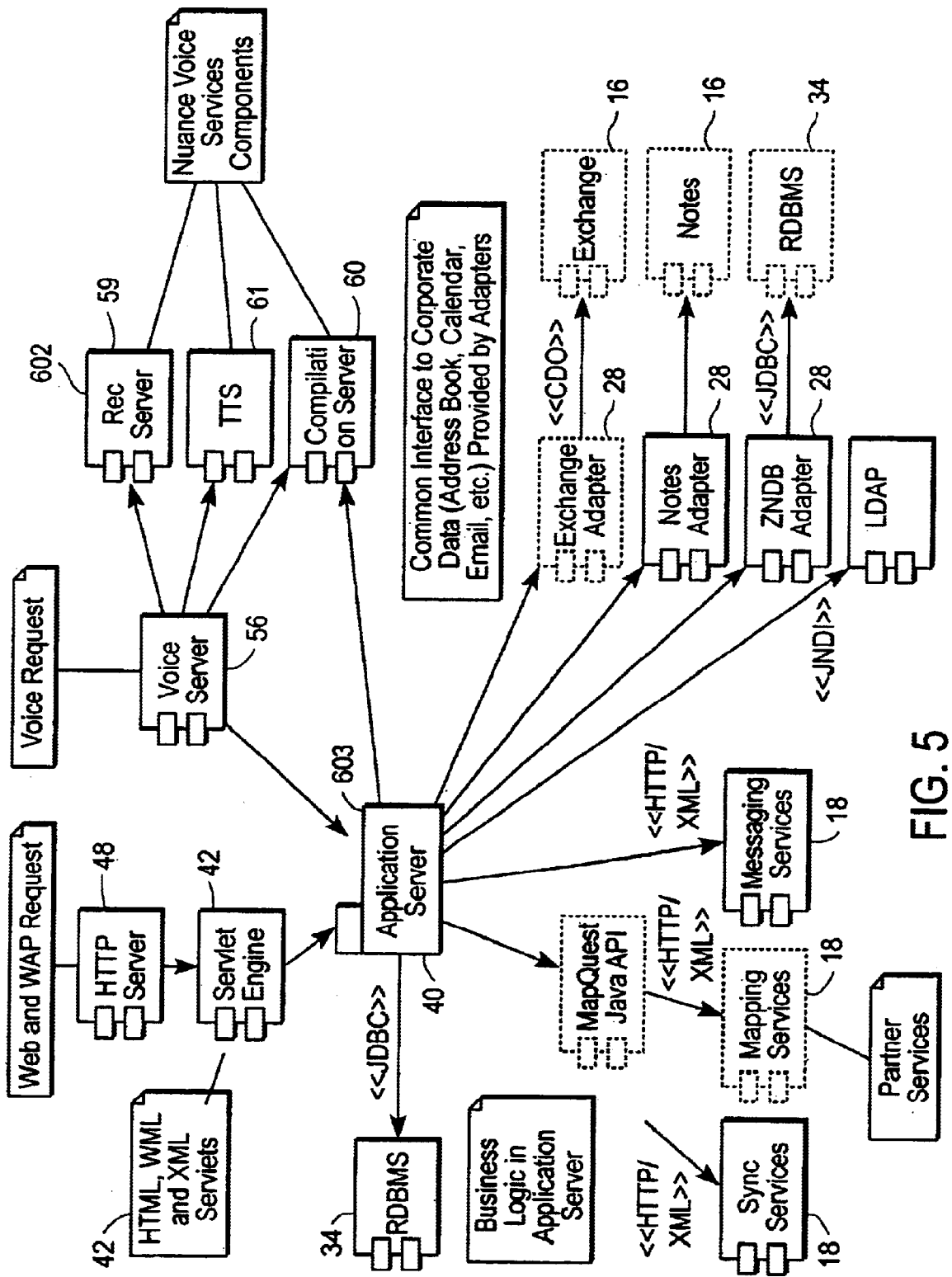
FIG. 5 is a component level block diagram of the logic of the system of the preferred embodiment.

Turning back to FIG. 3, servlets 42 (first tier) provide presentation logic for both Web and WAP communication. Business logic and smart integration rules are contained in application layer 44 (second tier). Persistence is handled in the data access layer 46 (third tier). Logically, as shown in FIGS. 3 and 5, application layer 44 and data access layer 46 are contained on application server 40. Application layer 44 uses ASP applications 18 through server to server communication.

Web server 48 is configured with servlet engine 50 to communicate with web devices 20b and wireless WAP devices 20a via the Internet 51. Servlet engine 50 responds with HTML 42a (for web users), WML 42b (for WAP users) and XML 42c for server to server communications with third parties. WAP requests come through a WAP gateway 52 or a wireless ISP (not shown). RMI 54 is used for distributed processing inside the system intranet. For voice communication, system 10 has voice server 56, which uses commercial voice services through NMS card 57 and speech API 58. It uses the same application services 14 (both internal and third party) via application layer 44 as Web and WAP devices to access address book, calendars, location services. Voice access to these services is through well-defined RMI interfaces 54. Application layer 44 uses compilation server 60 (through speech API 58) to compile dynamic grammars from grammar and voice print database 55 for various tasks such as when a user updates their address book from the Web. Voice server 56 communicates with the compilation server 60, recognition server 59 and TTS 61 using speech API 58.

Figure 6:
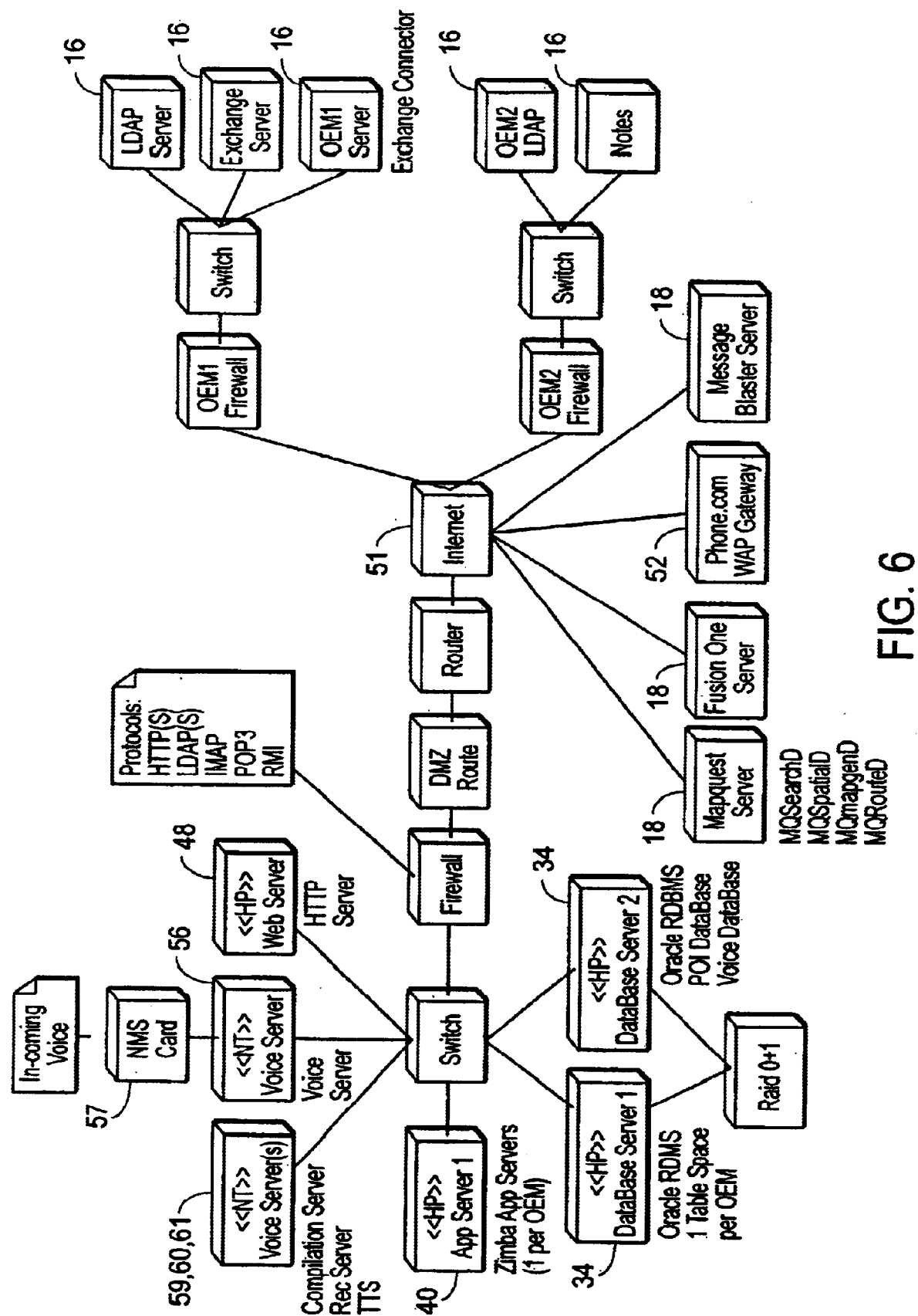
FIG. 6 is a block diagram of the physical nodes (i.e., hardware) of the system of the preferred embodiment.

FIGS. 5 and 6 further depict the architecture of system 10. FIG. 5 shows the system logic at the component level. In FIG. 5, boxes with the upper right corner turned down 601 represent notes, meta-data of annotations; boxes with two tabs on the left side 602 represent system modules and applications; and boxes with a single tab on top 603 represent packages (an exemplary box of each type is labeled in FIG. 5). Application server 40 is a package since it contains multiple components inside. FIG. 6 on the other hand shows the layout of the physical nodes (i.e. hardware) of System 10.

FIGS. 7–17 depict the system objects (both core objects and user oriented objects) and a wide variety of exemplary extraction adapters. Core objects 30 of System 10 are generic objects that serve to generalize data extracted by extraction adapters 28 from application data sources 14.

Figure 7:
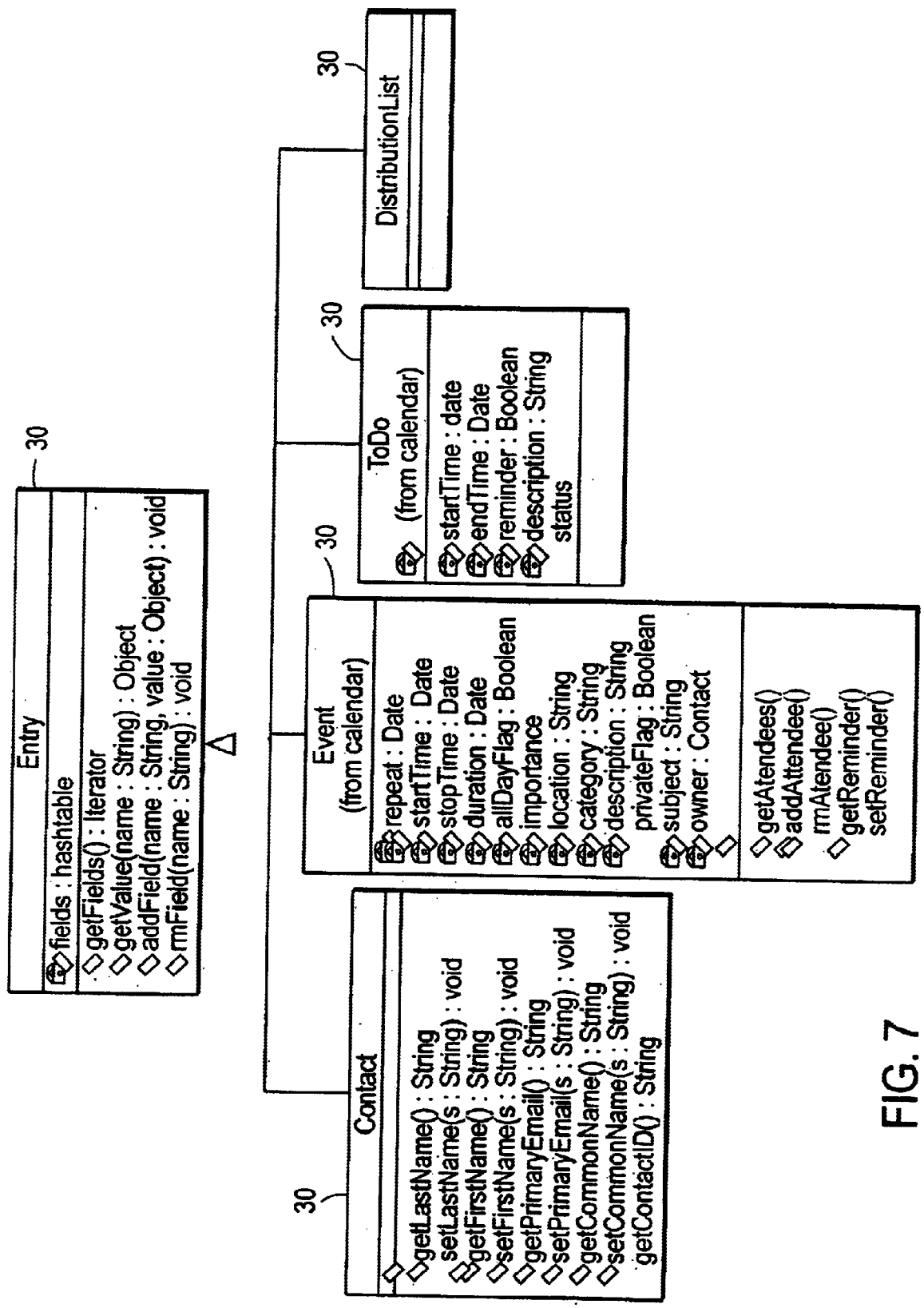
FIG. 7 is a logic diagram of the core objects of the system of the preferred embodiment.
Figure 9:
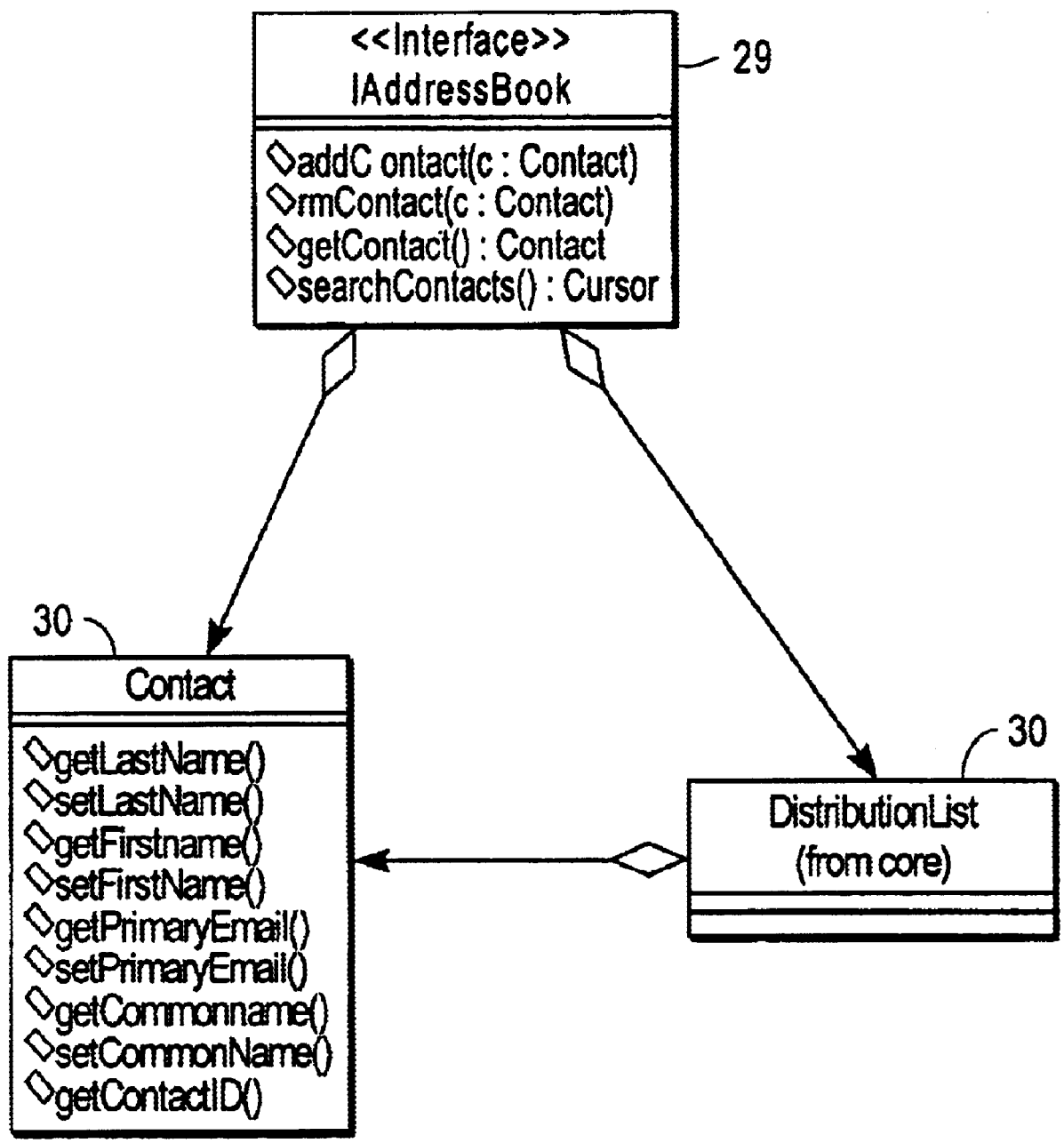
FIG. 9 is a logic diagram of the generic address book objects of the system of the preferred embodiment.
Figure 10:
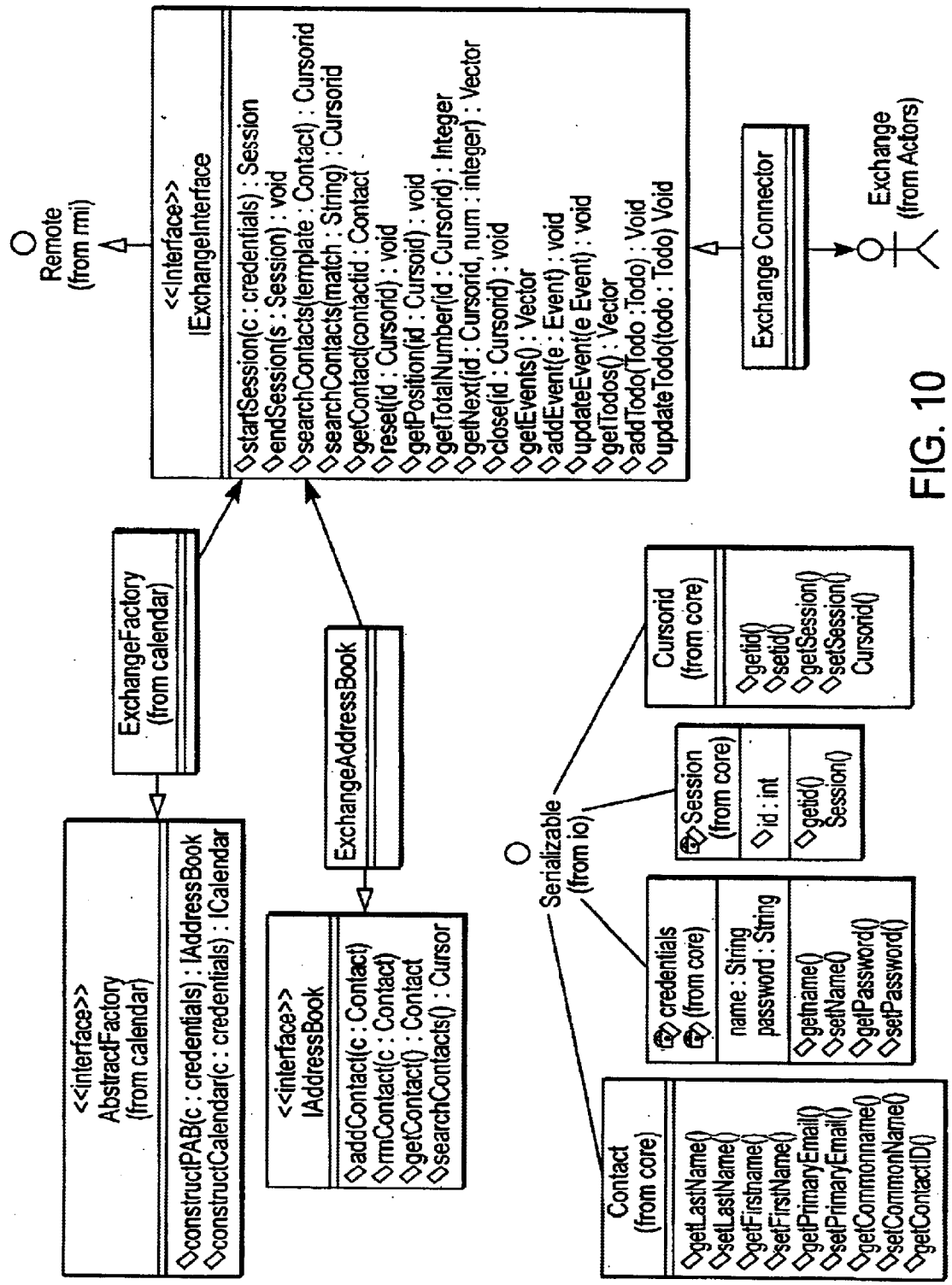
FIG. 10 is a logic diagram of the MS Exchange address book adapter of the system of the preferred embodiment.
Figure 11:
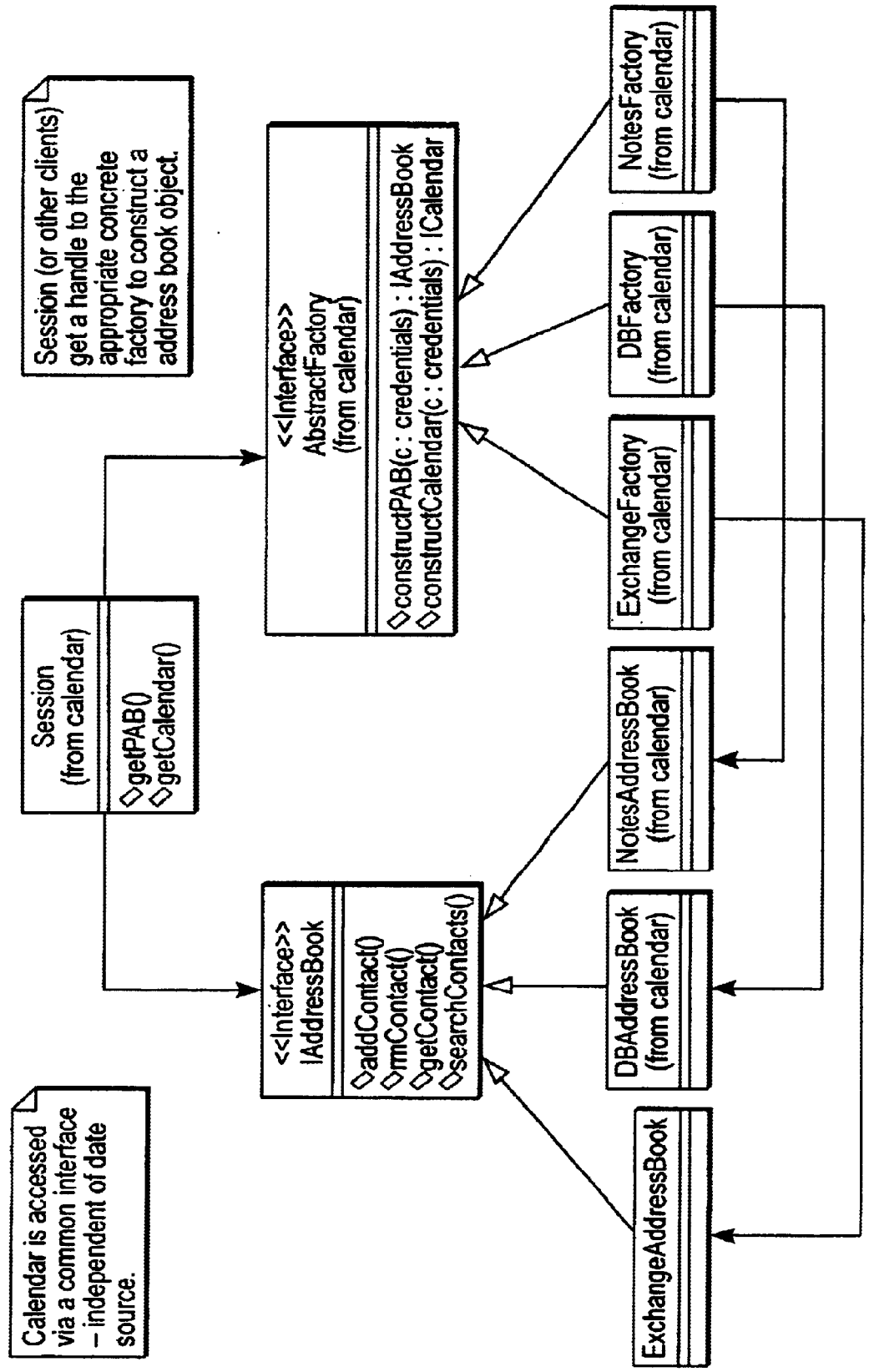
FIG. 11 is a logic diagram of the system hosted address book adapter of the system of the preferred embodiment.
Figure 12:
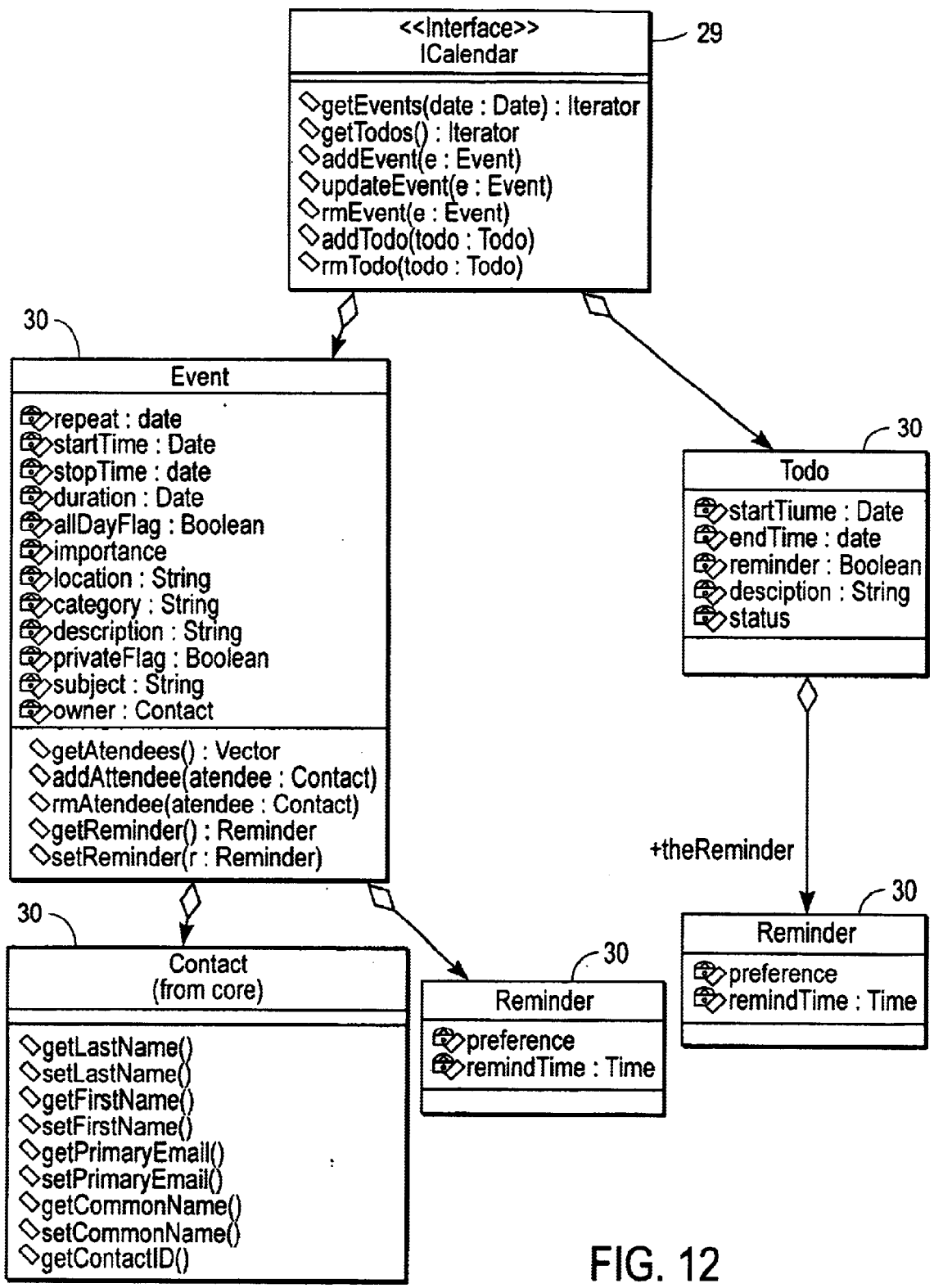
FIG. 12 is a logic diagram of the generic calendar objects of the system of the preferred embodiment.
Figure 13:
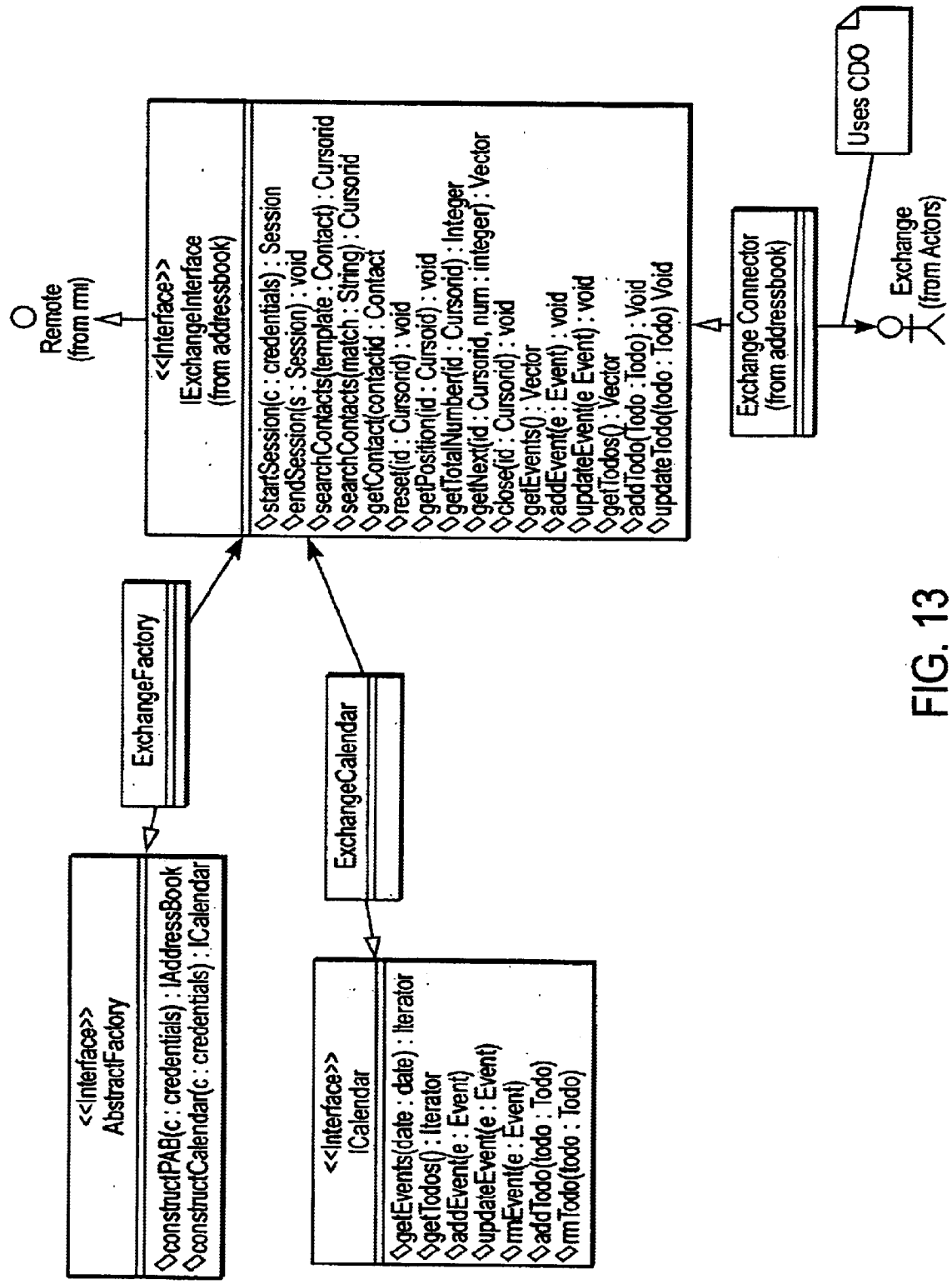
FIG. 13 is a logic diagram of the MS Exchange calendar adapter of the system of the preferred embodiment.
Figure 14:
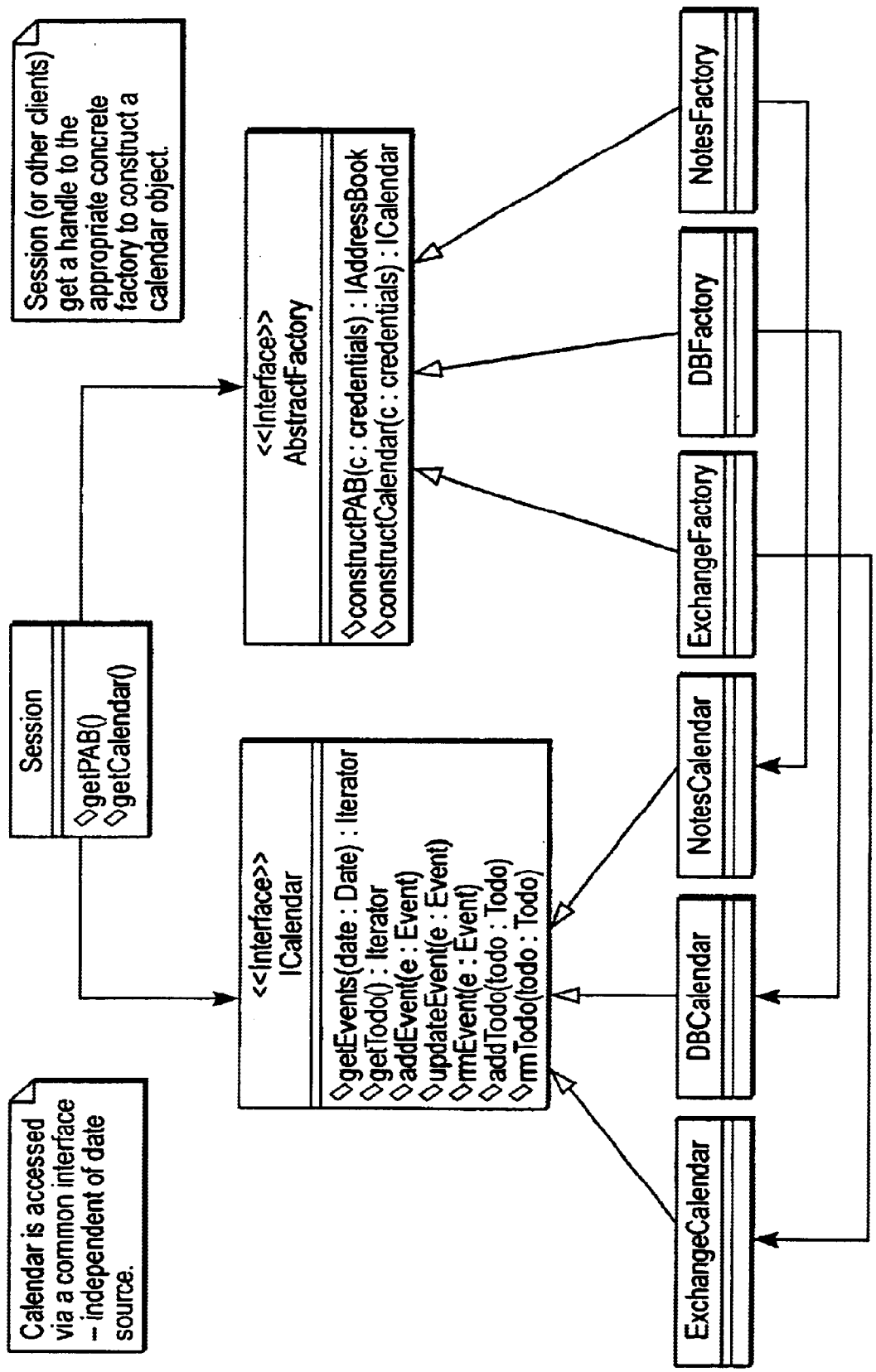
FIG. 14 is a logic diagram of the system hosted calendar adapter of the system of the preferred embodiment.
Figure 15A:
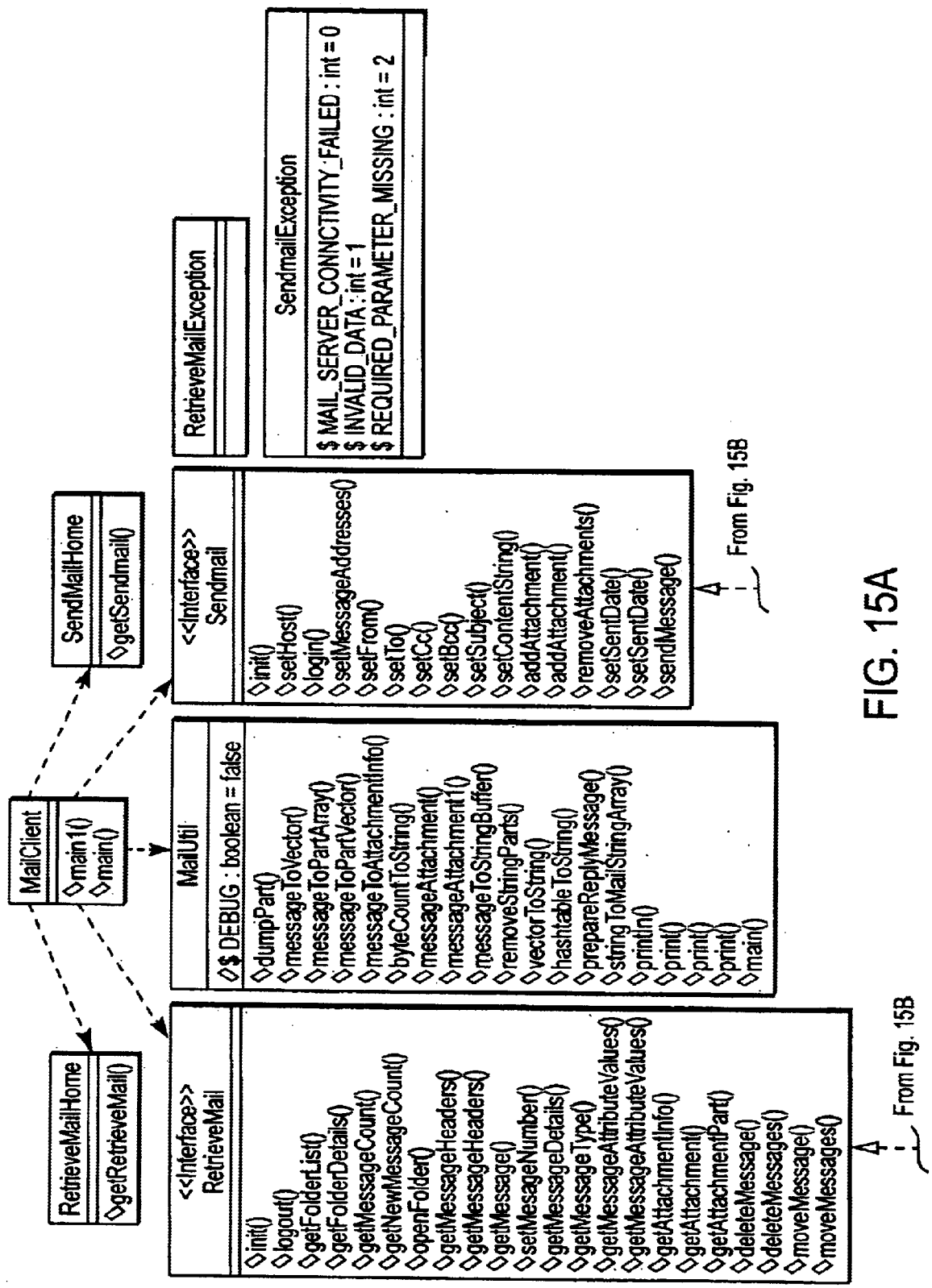
FIG. 15 is a logic diagram of the mail services adapter of the system of the preferred embodiment.
Figure 15B:
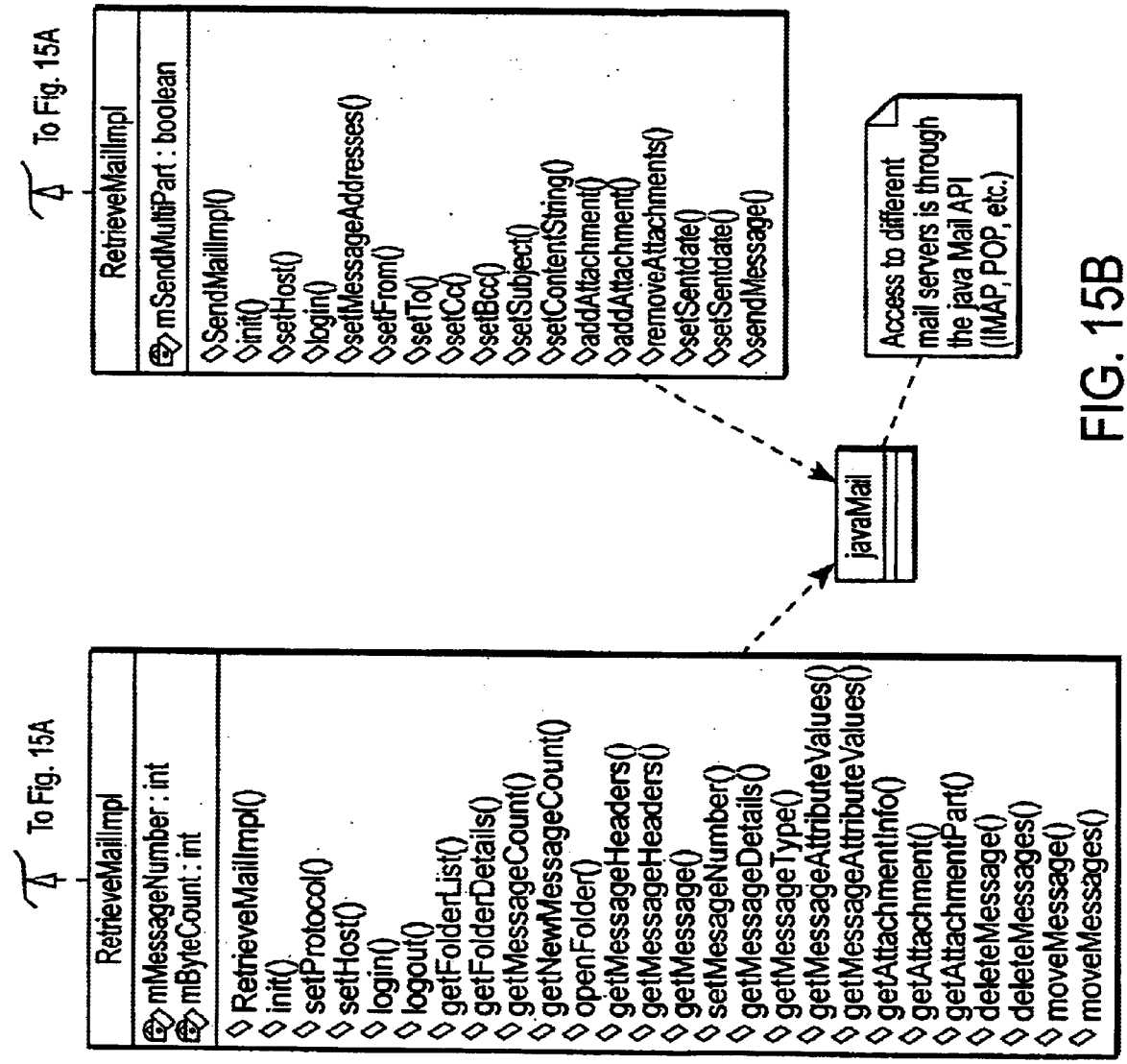
Figure 16A:
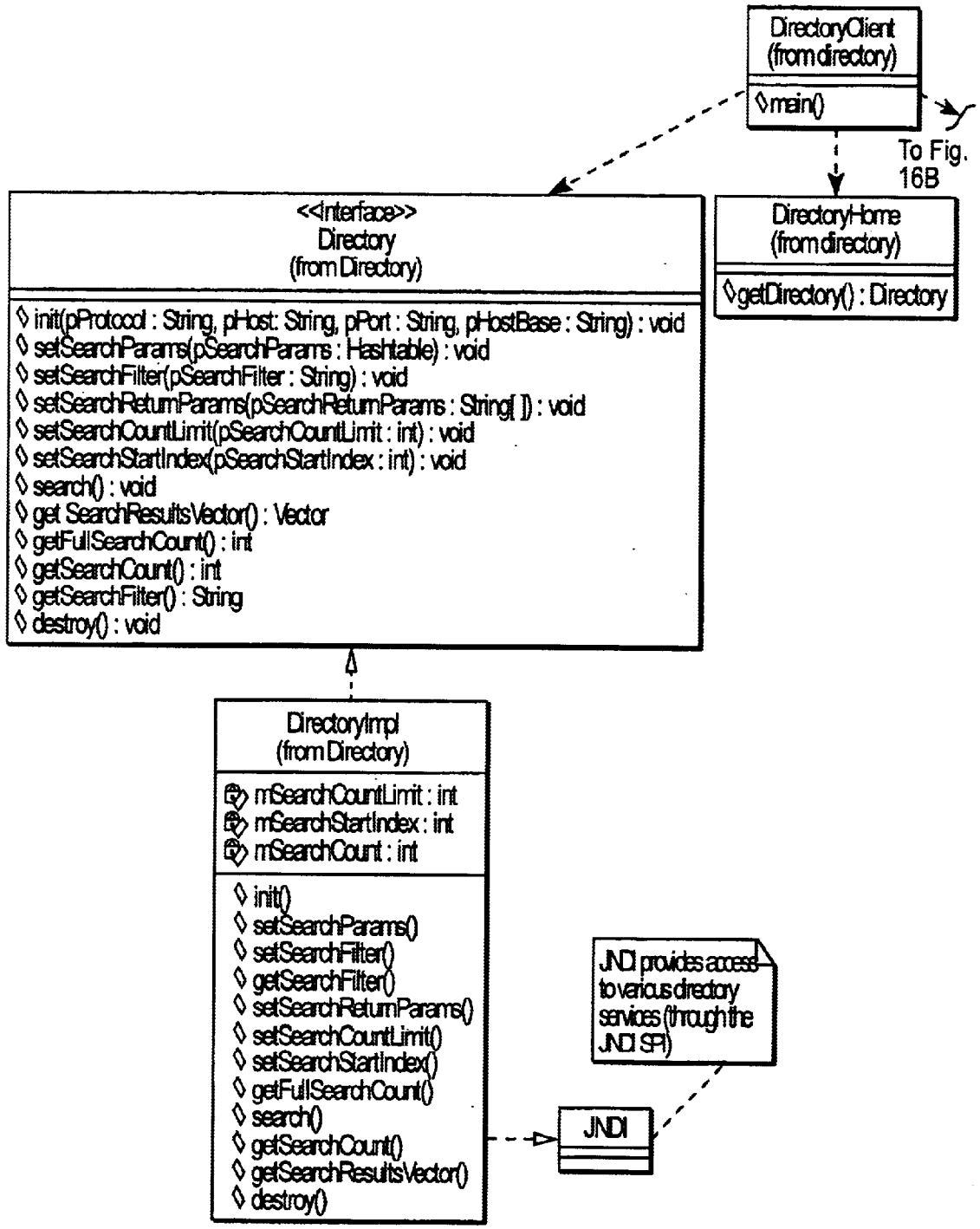
FIG. 16 is a logic diagram of the directory services adapter of the system of the preferred embodiment.
Figure 16B:
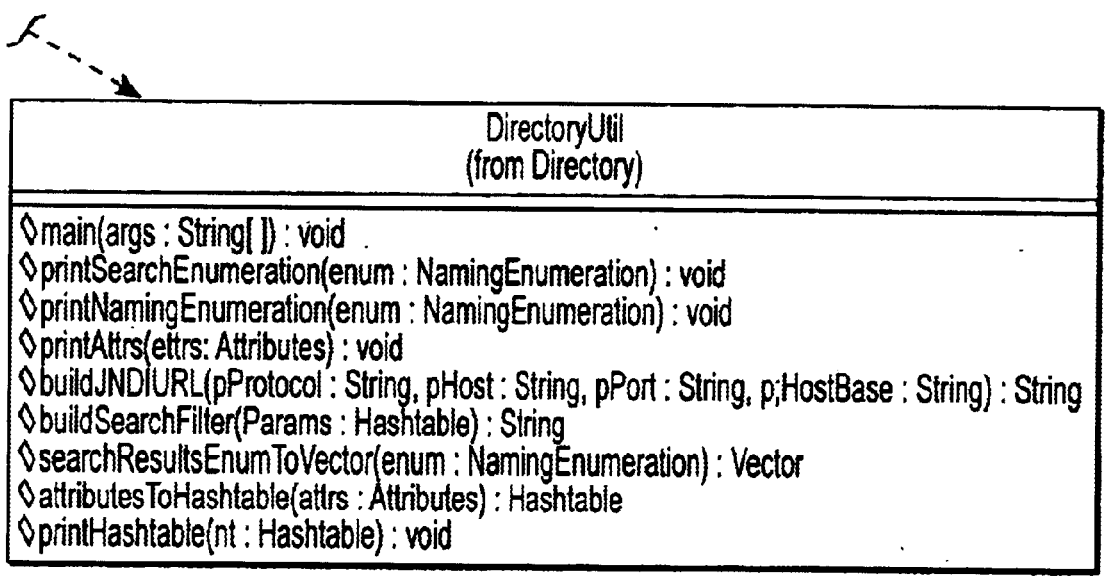
Figure 17:
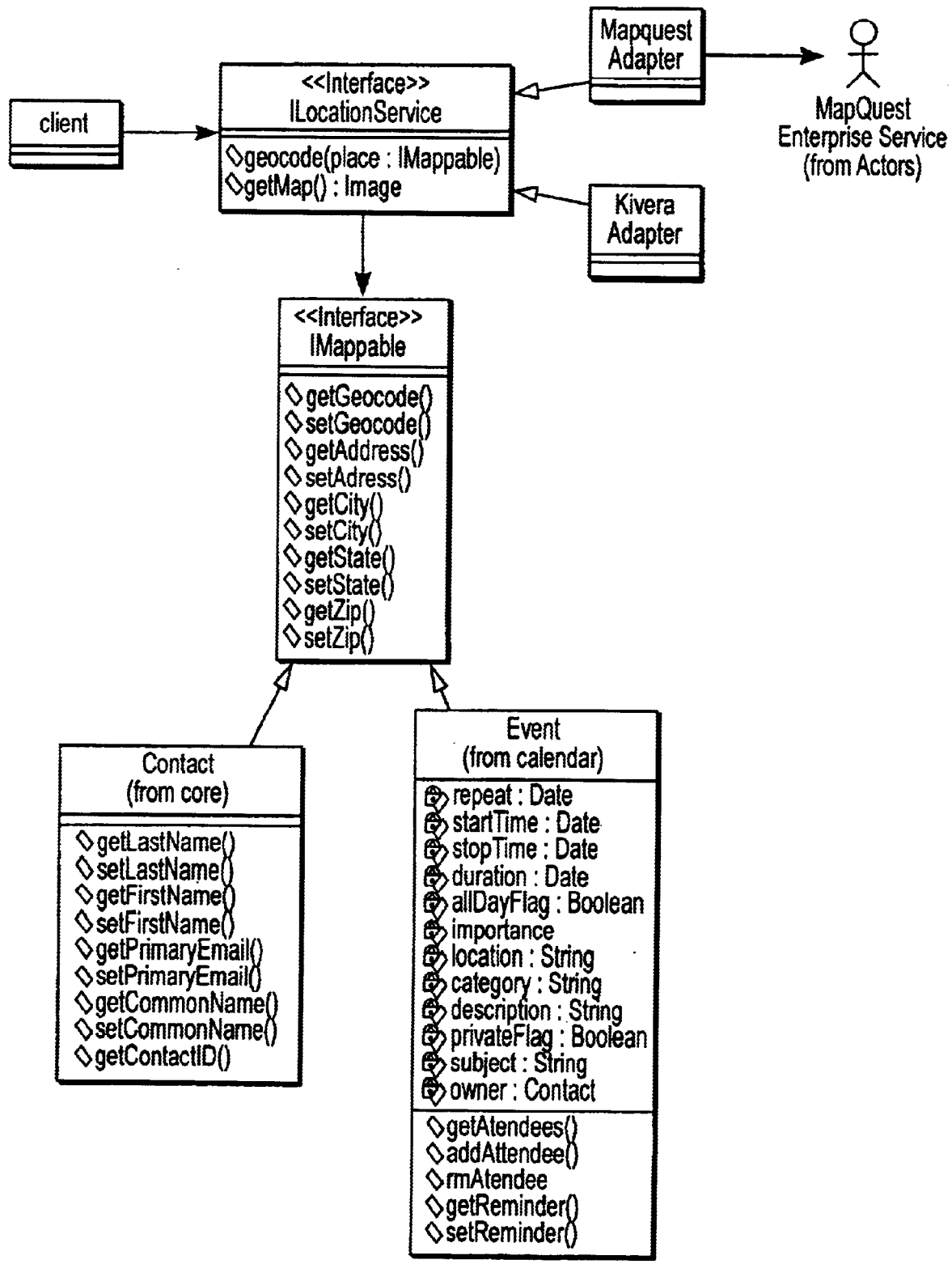
FIG. 17 is a logic diagram of the location services adapter of the system of the preferred embodiment.

FIG. 7 provides an overview of core objects 30, and FIGS. 9 and 12 depict the generic objects for address books and calendars. Although not depicted in the drawings, system 10 provides objects for all types of application data, including e-mail, directory services and the like.

Figure 8:
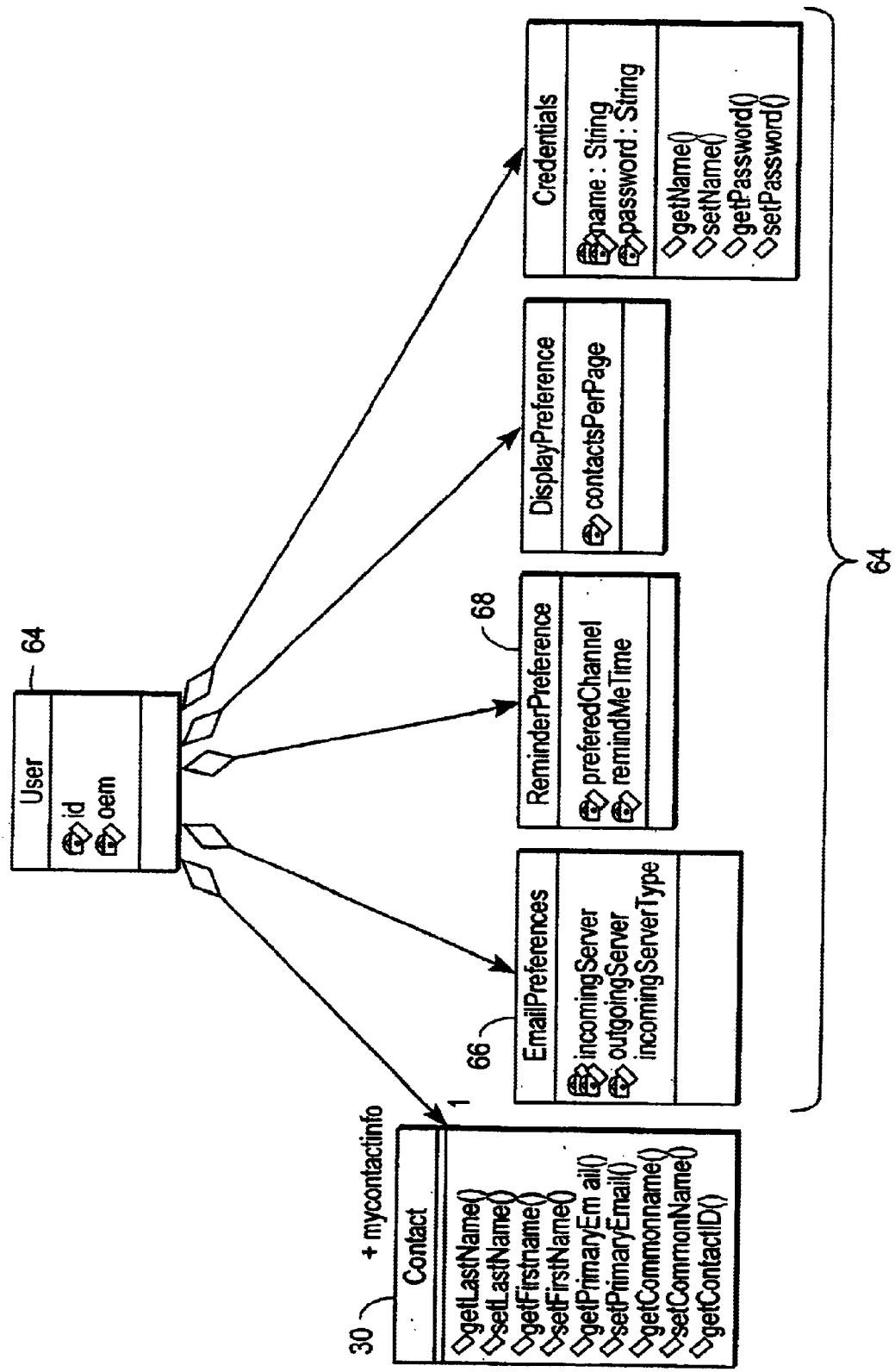
FIG. 8 is a logic diagram of the user oriented objects of the system of the preferred embodiment.

FIG. 8 depicts user-oriented objects 64 of system 10. User oriented objects 64 are internal objects which track mobile users' mobilization preferences and drive the functionality of system 10 so that system server 12 can perform various user oriented tasks. For example, e-mail preference object 66 allows system server 12 to send and receive users' e-mail by tracking users' incoming and outgoing e-mail servers. Also, reminder preference object 68 allows system server 12 to provide alerts to mobile users on particular, user defined communication channels at particular times. As a final example, credentials object allows system server 12 to track a mobile user's login name and password so that the mobile user does not have to endure repeated login procedures.

FIGS. 10, 11 and 13–17 depict some of extraction adapters 28 employed by system 10. Unique extraction adapters 28 are required for each unique application/data source 14, since the interface is different for each application/data source 14.

As used in FIGS. 10, 11 and 13–17, the term interface is used from the perspective of Java so that an interface represents an abstract set of functionality. In contrast, an adapter is a real component that does an actual function. In other words, extraction adapters 28 implement interfaces 29. While servlets 42 and voice server 56 handle presentation of data to and access of data from mobile devices 20, extraction adapters 28 handle the extraction and and generalization of data from applications/data sources 14.

In order to carry out the extraction from enterprise data stores, adapters 28 are built for common enterprise applications such as address books, calendars and directory services. Adapters 28 are built once for each application and reused. These tools can be though of as alternate forms of persisting objects.

While there are unique extraction adapters 28 for each unique application/data source 14 (i.e., multiple extraction adapters 28 per application type, there is only one set of generic objects per application type). For example, there are extraction adapters 28 for the system hosted (FIG. 11), MS Exchange (FIG. 10) and Lotus Notes (not shown) address books but only one set of generic address book objects (FIG. 9). It is this relationship that serves to generalize the extracted data. In short, extraction adapters 28 extract data from applications/data sources 14 based upon application specific rules and then construct generic objects independent of the specific source application.

Operation

System 10 communicates data from remote enterprise data stores 16 to web browsers on mobile devices 20 via system server 12 by extracting data objects from enterprise data stores 12 to the server; generalizing the extracted data object based upon application specific rules; and presenting the normalized data object on the web browser of mobile devices 20 based upon device specific rules.

Moreover, system 10 allows for seamless integration between a variety of mobile applications such as address books, email, calendars, directory services and point to point directions. Rather than having to switch from application to application on mobile devices 20, system 10 allows users to utilize a data point available from a data set in one application to access a set of data in another application. By way of example, a user may access a set of data regarding a customer from the users address book application. The user could then transition to a point to point direction application carrying over the customers address as the data point from the dataset from the address book. System 10 then uses the address data point to obtain a set of data in the form of turn by turn instructions from the point to point direction service data store.

Thus, system 10 provides a method of extracting data from remote data sources 14 to present on a web browser on mobile device 20. The methodology involves extracting a first set of data from a first data source to the server; generating a first data object based upon the first set of data; identifying a crossover data point in the first data object corresponding to a target data point contained in a second data source; extracting a second set of data from the second data source based upon the crossover data point to the server; and presenting the second set of data on the web browser of the mobile device based upon device specific rules. Additionally, the extracted second set of data is generalized based upon application specific rules prior to presenting on mobile devices 20.

The data extracted using extraction adapters 28 is used to construct generic objects 30 in system server 12, which serves to generalize the data. In terms of the preferred embodiment, the generalized data is in a form independent of (i.e., isolated from) the source application or data store. For example, data may be extracted from a MS Exchange address book or a Lotus Notes address book for the same contact. Once generalized, the data is in the same generic, universal form (i.e., structure) regardless of the extraction source. Thus, mobile users interact with generic objects on system server 12 which are independent of the application/data source rather than the actual data at the source.

Extraction adapters 28 take as their parameters objects as subjects. By way of example, an e-mail component may have a call such as "read me any mail I get." In addition, when the user gets that e-mail, the email header may also useful information. So, the e-mail may have another call that says "give me the sender" (i.e., who is the sender of this e-mail).

Continuing with the example, similarly there is a second service that is a directory service. The directory service is a third party ASP service that is not part of the user's enterprise sources (typically sources provided by the user's employer). Therefore, the directory service has its own set of interfaces defined, one of which looks up a contact using an e-mail address. The relevant object is the e-mail address object that was extracted out of the e-mail object itself and now is being used as the e-mail address in looking up the contact out of the directory. The end result of that call is the creation of a generic contact object (which includes all of the contacts properties and information such as work address and home address), and this contact object now can be used in yet another service potentially, such as point to point directions. To do so system server 12 links to a point to point direction ASP service to get directions to the previously extracted contact. The direction service provides directions from the users work address because the user is the one maintaining the session.

The mobile user could have just as easily, after the directory service, gone to a calling service (make a phone call service instead to make a call to the contact's cell phone because the directory object constructed from the directory service also included the cell phone number as a component of the directory object.

By being able to re-use context across all available services, in effect there are an unlimited number of hops or different workflow combinations that a mobile user may use in navigating system 10 without having to re-key or re-input information despite the fact that the mobile user is accessing a multitude of distinct services.

The key communication mechanism is the system's domain object model, which enables the use of data crossover points. The crossover points allow system 10 to cross over from an e-mail workflow to a directory look up workflow as part of the same integrated application. For example, when reading an e-mail, the mobile user gets three typical choices (read—reply—forward) and also a fourth choice to look up the sender in directory which when chosen shifts to a directory workflow. From the directory workflow, the mobile user has the option to cross over to another service thereby entering another workflow.

To summarize the operation of system 10 by way of another example, when a mobile user receives an e-mail, the e-mail service extraction adapter extracts the e-mail data (including the sender's name) and constructs the e-mail object. To cross over to the mobile user's address book application, system server 12 utilizes an address book extraction adapter to extract data from the address book application using the sender name as the crossover point. Based on the sender name, the address book extraction adaptor extracts the address book data corresponding to sender name and constructs an address book object. System server 12 will then extract additional information from a map service and construct a map object using the sender address from the address book object as the crossover data point. The location object is then presented to the mobile user in the form of a map on the mobile device. Thus, for a multitude of applications/data sources 14, by setting up cross over points that can use the objects from any other system, application/data sources 14 are intelligently integrated and provide a limitless combination of user workflows that cross over all applications/data sources 14.

Figure 18A:
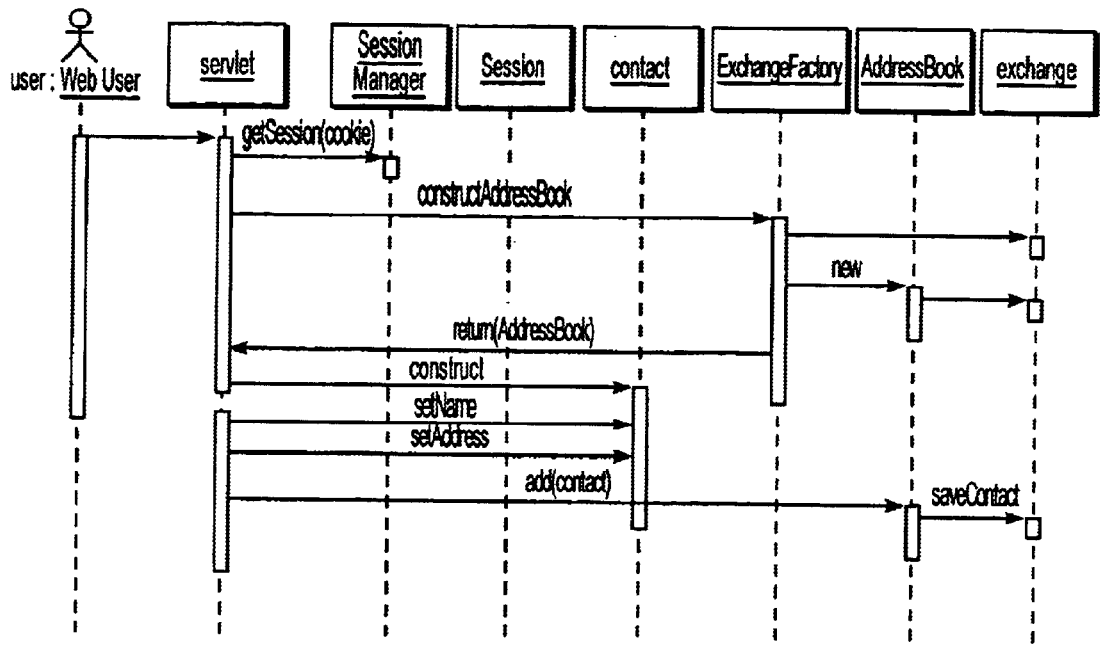
FIGS. 18a–c are object interaction diagrams for three hypothetical data communication sessions.
Figure 18B:
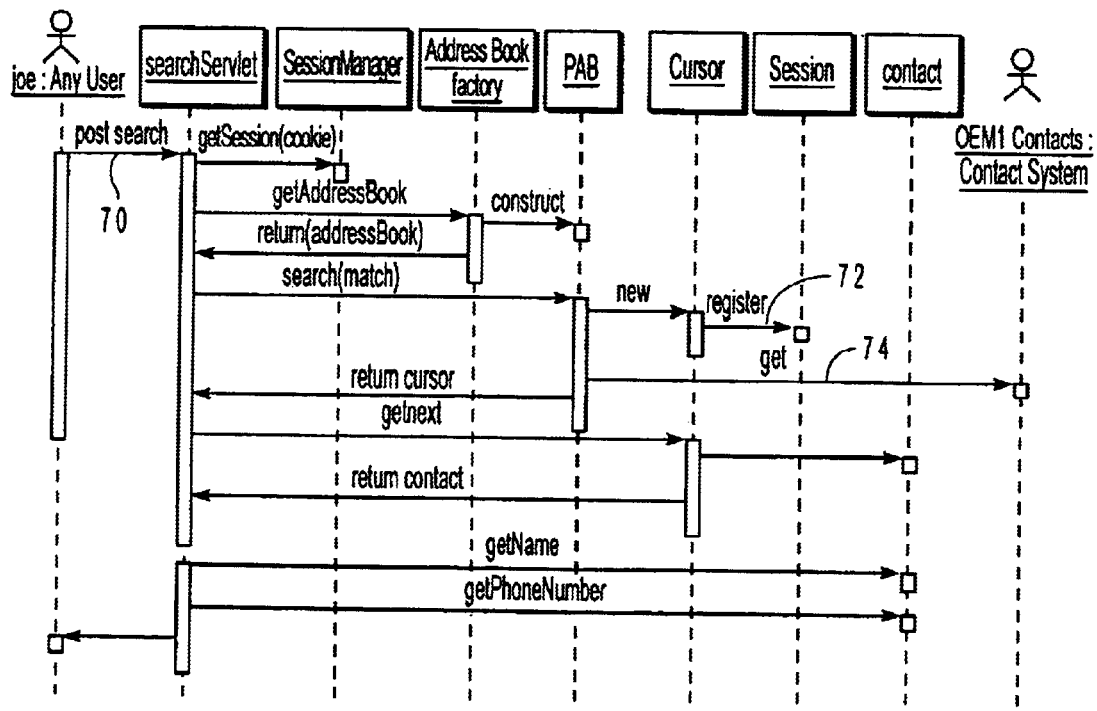
Figure 18C:
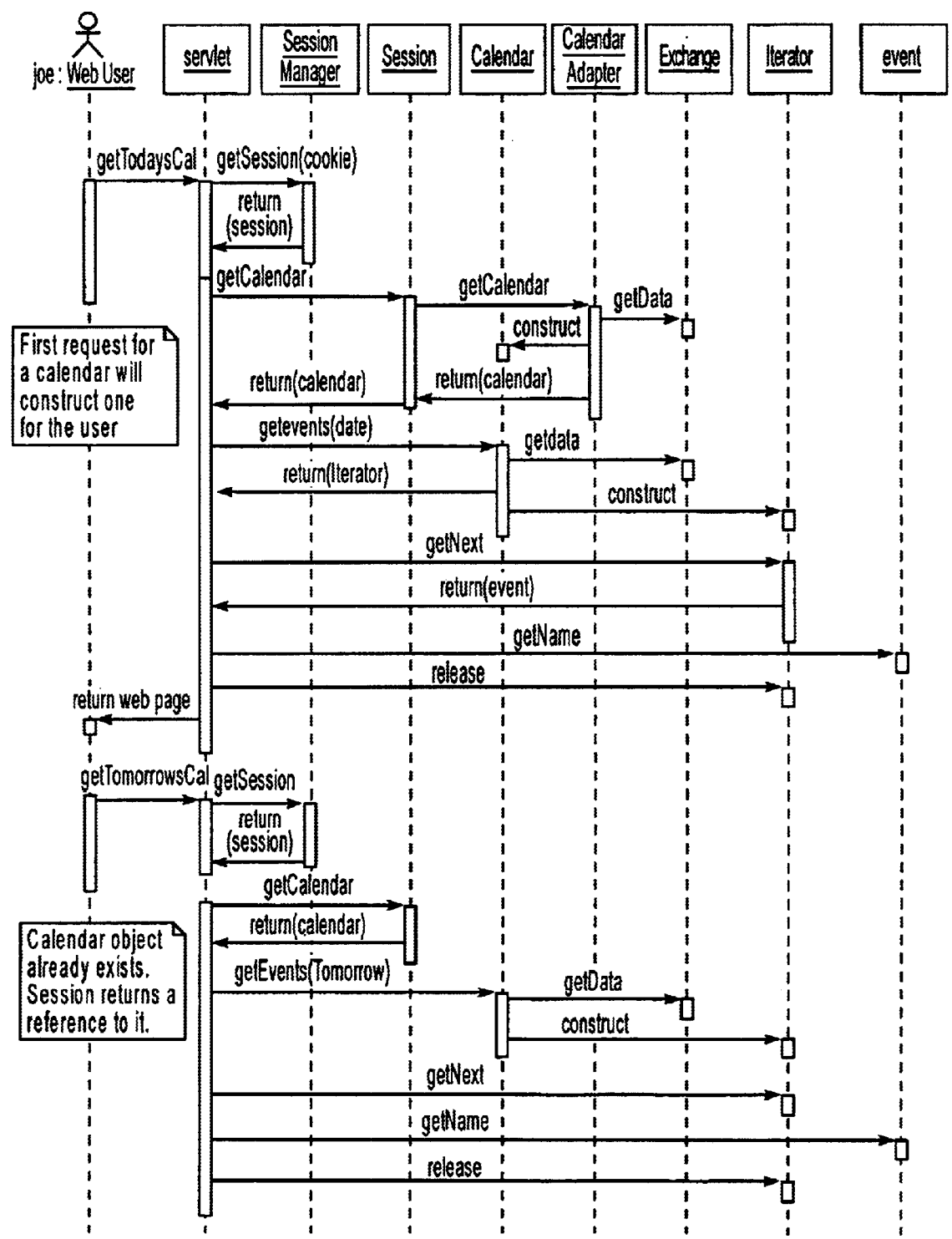

FIGS. 18a–c depict various scenarios in UML (Unified Modeling Language) describing the behavior of the software of system 10. In other words, the figures show how communication occurs between different components of system 10. In FIG. 18a, a session is depicted in which data is extracted from MS Exchange to create a new contact in an address book. The process of system server 12 is independent of the backend application which in this case is MS Exchange but could be my other proprietary service of enterprise system. In FIG. 18b, a session is depicted in which a search is performed for a contact in a custom contact management system at a particular enterprise for a given search criteria. The "post-search" 70 through "register" 72 steps are all generic to system 10 (i.e., part of the generic object model). The only call to the enterprise system is the "get" command 74 which goes to the enterprise system to extract data which is then generalized by construction into a generic format (i.e., construction of a generic object). In FIG. 18c, a session is depicted in which a search for particular dates in a calendar application to retrieve events for those dates from a MS Exchange system. The key generic object in this session is the event object.

From the above description, it will be apparent that the invention disclosed herein provides a novel and advantageous solution to the problems of mobile data communications. The foregoing discussion discloses and describes merely exemplary methods and embodiments of the present invention. One skilled in the art will readily recognize from such discussion that various changes, modifications and variations may be made therein without departing from the spirit and scope of the invention. Accordingly, disclosure of the present invention is intended to be illustrative, but not limiting, of the scope of the invention, which is set forth in the following claims.

We claim:

1. A method of compiling data from a plurality of remote application data sources to present on a mobile device via a system server, comprising:

extracting a first set of data from a first application data source to the system server;

constructing a first generic data object based upon the first set of extracted data;

identifying a crossover data point in the first data set corresponding to a target data point contained in a second application data source;

extracting to the system server a second set of data from the second application data source corresponding to the target data point constructing a second generic data object based upon the second set of extracted data; and presenting the second data object on the mobile device based upon device specific rules.

2. The method recited in claim 1 further comprising:

transmitting the extracted data to the system server; and transmitting the generalized data to the mobile device via the internet.

3. The method recited in claim 1, further comprising:

generalizing the extracted first and second set of data based upon application specific rules prior to presenting on the mobile device.

4. The method of claim 1 further comprising:

sending a first request to the first application data source from the mobile device wherein the first set of data is extracted from the first application data source based upon the first request; and sending a second request to the second application data source from the mobile device wherein the second set of data is extracted based upon the second request.

5. The method recited in claim 1 further comprising:

presenting the first and second data objects within a generic application template on the mobile device.

6. The method of claim 1, further comprising:

presenting the first data object on the mobile device based upon device-specific rules.

7. A mobile data communication system comprising:

an internet based server coupled to the application specific remote data sources comprising:

a server database, interface means for extracting a first set of data from a first application specific remote data source of the application specific remote data sources, means for generalizing the extracted first set of data, means for presenting the generalized first set of data;

means for identifying crossover data points in the first application specific remote data source corresponding to a target data point in a second of the plurality of application specific remote data sources;

means for extracting a second set of data from the second application specific remote data source corresponding to the target data point;

means for generalizing the extracted second set of data;

means for presenting the generalized second set of data.

8. The mobile communication system recited in claim 7, wherein the means for generalizing constructs generic objects from the extracted data.

9. The mobile communication system recited in claim 7, wherein mobile devices generate requests for the application specific remote data sources that are used by the interface means as a basis for extracting data.

10. A data communications server apparatus for communicating data between a plurality of remote application data sources and at least one mobile device, comprising:

interface means for extracting data from a first of the application specific remote data sources, means for generalizing the extracted data based upon application specific rules, means for presenting the generalized data to the at least one mobile device based upon device specific rules, means for identifying crossover data points in the first application specific remote data source corresponding to a target data point in a second of the plurality of application specific remote data sources.

11. The server apparatus recited in claim 10, wherein the means for generalizing constructs generic objects from the extracted data.

12. The server apparatus recited in claim 10, wherein the interface means and means for generalizing are application specific object oriented adapters.

13. The server apparatus recited in claim 10, wherein the means for presenting is a servlet engine having device specific rules.

* * * * *